US008856255B2

(12) United States Patent
Ramakrishnan et al.

(10) Patent No.: US 8,856,255 B2
(45) Date of Patent: *Oct. 7, 2014

(54) METHODS AND APPARATUS TO MIGRATE VIRTUAL MACHINES BETWEEN DISTRIBUTIVE COMPUTING NETWORKS ACROSS A WIDE AREA NETWORK

(71) Applicants: AT&T Intellectual Property I, L.P., Atlanta, GA (US); University of Massachusetts, Boston, MA (US)

(72) Inventors: Kadangode K. Ramakrishnan, Berkeley Heights, NJ (US); Jacobus E. Van der Merwe, Salt Lake City, UT (US); Prashant Shenoy, Northampton, MA (US); Timothy Wood, Columbia, MD (US)

(73) Assignees: AT&T Intellectual Property I, L.P., Atlanta, GA (US); University of Massachusetts, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,464

(22) Filed: Jun. 24, 2013

(65) Prior Publication Data

US 2013/0290468 A1    Oct. 31, 2013

Related U.S. Application Data

(63) Continuation of application No. 12/862,382, filed on Aug. 24, 2010, now Pat. No. 8,473,557.

(51) Int. Cl.
*G06F 15/16*        (2006.01)
(52) U.S. Cl.
USPC ......................................... 709/206; 709/213

(58) Field of Classification Search
USPC .................................................. 709/206, 213
See application file for complete search history.

(56) References Cited

U.S. PATENT DOCUMENTS

| | | |
|---|---|---|
| 5,475,819 A | 12/1995 | Miller et al. |
| 5,623,601 A | 4/1997 | Vu |
| 6,058,426 A | 5/2000 | Godwin et al. |
| 6,079,020 A | 6/2000 | Liu |
| 6,205,488 B1 | 3/2001 | Casey et al. |
| 6,636,898 B1 | 10/2003 | Ludovici et al. |
| 6,781,982 B1 | 8/2004 | Borella et al. |
| 6,880,002 B2 | 4/2005 | Hirschfeld et al. |
| 6,990,666 B2 | 1/2006 | Hirschfeld et al. |
| 7,072,346 B2 | 7/2006 | Hama |

(Continued)

OTHER PUBLICATIONS

U.S. Office Action dated Aug. 30, 2012 in U.S. Appl. No. 12/862,382.

(Continued)

*Primary Examiner* — Asghar Bilgrami
(74) *Attorney, Agent, or Firm* — Hartman & Citrin LLC

(57) ABSTRACT

Methods and apparatus to migrate virtual machines between distributive computing networks across a network are disclosed. A disclosed example method includes establishing a data link across a network between a first distributive computing network and a second distributive computing network, the first distributive computing network including a virtual machine operated by a first host communicatively coupled to a virtual private network via a first virtual local area network, communicatively coupling a second host included within the second distributive computing network to the virtual private network via a second virtual local area network, and migrating the virtual machine via the data link by transmitting a memory state of at least one application on the first host to the second host while the at least one application is operating.

20 Claims, 10 Drawing Sheets

(56) References Cited

U.S. PATENT DOCUMENTS

| | | |
|---|---|---|
| 7,075,933 B2 | 7/2006 | Aysan |
| 7,131,141 B1 | 10/2006 | Blewett et al. |
| 7,185,106 B1 | 2/2007 | Moberg et al. |
| 7,203,944 B1 | 4/2007 | van Rietschote |
| 7,221,675 B2 | 5/2007 | Bryden et al. |
| 7,225,270 B2 | 5/2007 | Barr et al. |
| 7,257,811 B2 | 8/2007 | Hunt et al. |
| 7,340,519 B1 | 3/2008 | Golan et al. |
| 7,366,188 B2 | 4/2008 | Kim |
| 7,370,164 B1 | 5/2008 | Nagarkar et al. |
| 7,388,844 B1 | 6/2008 | Brown et al. |
| 7,400,611 B2 | 7/2008 | Mukherjee et al. |
| 7,420,958 B1 | 9/2008 | Marques |
| 7,564,802 B2 | 7/2009 | Andrapalliyal et al. |
| 7,577,722 B1 | 8/2009 | Khandekar et al. |
| 7,587,492 B2 | 9/2009 | Dyck et al. |
| 7,603,670 B1 | 10/2009 | van Rietschote |
| 7,616,574 B2 | 11/2009 | Previdi et al. |
| 7,680,919 B2 | 3/2010 | Nelson |
| 7,751,405 B1 | 7/2010 | Kompella |
| 7,870,604 B1 | 1/2011 | Guichard et al. |
| 7,912,856 B2 | 3/2011 | Hannel et al. |
| 7,921,686 B2 | 4/2011 | Bagepalli et al. |
| 7,937,438 B1 | 5/2011 | Miller et al. |
| 8,027,347 B2 | 9/2011 | Ould-Brahim |
| 8,064,440 B2 | 11/2011 | Bhaskar |
| 8,117,325 B1 | 2/2012 | Wu |
| 8,117,338 B2 | 2/2012 | Ould-Brahim |
| 2002/0181477 A1 | 12/2002 | Mo et al. |
| 2003/0016672 A1 | 1/2003 | Rosen et al. |
| 2003/0051021 A1 | 3/2003 | Hirschfeld et al. |
| 2003/0188001 A1 | 10/2003 | Eisenberg et al. |
| 2004/0148439 A1 | 7/2004 | Harvey et al. |
| 2005/0066053 A1 | 3/2005 | McDysan |
| 2005/0138204 A1 | 6/2005 | Iyer et al. |
| 2005/0251802 A1 | 11/2005 | Bozek et al. |
| 2006/0010176 A1 | 1/2006 | Armington |
| 2006/0101189 A1 | 5/2006 | Chandrasekaran et al. |
| 2006/0165087 A1 | 7/2006 | Page et al. |
| 2006/0168279 A1 | 7/2006 | Lee et al. |
| 2006/0168321 A1 | 7/2006 | Eisenberg et al. |
| 2006/0195715 A1 | 8/2006 | Herington |
| 2006/0251088 A1 | 11/2006 | Thubert et al. |
| 2007/0019676 A1 | 1/2007 | Kompella |
| 2007/0133577 A1 | 6/2007 | Dong |
| 2007/0140250 A1 | 6/2007 | McAllister et al. |
| 2007/0140251 A1 | 6/2007 | Dong |
| 2007/0195800 A1 | 8/2007 | Yang et al. |
| 2007/0217419 A1 | 9/2007 | Vasseur |
| 2007/0280241 A1 | 12/2007 | Verma |
| 2008/0002697 A1 | 1/2008 | Anantharamaiah et al. |
| 2008/0034365 A1 | 2/2008 | Dahlstedt |
| 2008/0043764 A1 | 2/2008 | Ishizaki et al. |
| 2008/0049752 A1 | 2/2008 | Grant |
| 2008/0065826 A1 | 3/2008 | Recio et al. |
| 2008/0080396 A1 | 4/2008 | Meijer et al. |
| 2008/0080497 A1 | 4/2008 | Meijer et al. |
| 2008/0080517 A1 | 4/2008 | Roy et al. |
| 2008/0080526 A1 | 4/2008 | Gounares |
| 2008/0080552 A1 | 4/2008 | Gates et al. |
| 2008/0082546 A1 | 4/2008 | Meijer et al. |
| 2008/0170578 A1 | 7/2008 | Ould-Brahim |
| 2009/0144393 A1 | 6/2009 | Kudo |
| 2009/0276771 A1 | 11/2009 | Nickolov et al. |
| 2010/0111093 A1 | 5/2010 | Satterlee et al. |
| 2010/0115604 A1 | 5/2010 | Gerber et al. |
| 2010/0329265 A1 | 12/2010 | Lapuh et al. |
| 2011/0075674 A1 | 3/2011 | Li et al. |
| 2011/0110370 A1 | 5/2011 | Moreno et al. |
| 2011/0119381 A1 | 5/2011 | Glover et al. |
| 2011/0134931 A1 | 6/2011 | Van Der Merwe et al. |
| 2011/0142053 A1 | 6/2011 | Van Der Merwe et al. |
| 2011/0238775 A1 | 9/2011 | Wu et al. |
| 2011/0321041 A1 | 12/2011 | Bhat et al. |
| 2012/0054367 A1 | 3/2012 | Ramakrishnan et al. |
| 2012/0297073 A1 | 11/2012 | Glover et al. |
| 2013/0246626 A1 | 9/2013 | Glover et al. |

OTHER PUBLICATIONS

U.S. Notice of Allowance dated Feb. 20, 2013 in U.S. Appl. No. 12/862,382.

Aggarwal, et al. "EndRE: An End-System Redundancy Elimination Service for Enterprises," Mar. 30, 2010 (14 pages).

Wood, T., "CloudNet: A platform for optimized WAN migration of virtual machines." Technical report, University of Massachusetts, CS Dept., Jan. 20, 2010 (15 pages).

Cisco, "Cisco Active Network Abstraction," http://www.cisco.com/go/ana, Apr. 26, 2006 (1 page).

Juniper, "JUNOS Software, Configuration and Diagnostic Automation Guide," http://www.juniper.net, Oct. 16, 2009, (492 pages).

Cisco, "Virtual machine mobility with vmware VMotion and cisco data center interconnect technologies," http://www.cisco.com/en/US/solutions/collateral/ns340/ns224/ns836/white_paper_c11-557822.pdf, Sep. 1, 2009, (17 pages).

Amazon.com, "Amazon Elastic Computing Cloud," http://aws.amazon.com/ec2. Retrieved from the Internet on Aug. 25, 2006 (11 pages).

Anand, Ashok, et al. SmartRE: an architecture for coordinated network-wide redundancy elimination. SIGCOMM Comput. Commun. Rev., 39(4): 87-98, Aug. 17, 2009, (12 pages).

Armbrust et al., "Above the Clouds: A Berkeley View of Cloud Computing," Technical Report UCB/EECS-2009-28, EECS Department, University of California, Berkeley, Feb. Technical Report No. UCB/EECS-2009-28, http://www.eecs.berkeley.edu/Pubs/TechRpts/2009/EECS-2009-28.html, Feb. 10, 2009 (25 pages).

Bradford, Robert, et al., "Live wide-area migration of virtual machines including local persistent state," In Proceedings of the 3rd international conference on virtual execution environments, pp. 169-179, San Diego, California, USA, Jun. 13, 2007, ACM. (11 pages).

Chen, Xu, et al., "ShadowNet: a platform for rapid and safe network evolution," in USENIX Annual Technical Conference, Jun. 14, 2009, (14 pages).

Clark et al., "Live Migration of Virtual Machines," in Proceedings of NSDA, http://www.cl.cam.ac.uk/research/srg/netos/papers/2005-migration-nsdi-pre.pdf, May 2, 2005 (14 pages).

Cully, Brendan, et al. "Remus: High availability via asynchronous virtual machine replication," in NSDI 08, Apr. 16, 2008, (25 pages).

DRBD, Software Development for High Availability Clusters, http://drbd.org/, Oct. 2008 (1 page).

Duffield, N. G., et al., "Resource management with hoses: point-to-cloud services for virtual private networks," IEEE/ACM Transactions on Networking, 10(5), Dec. 10, 2002 (16 pages).

Cohen, Reuven, "Virtual private cloud," http://www.elasticvapor.com/2008/05/virtual-private-cloud-vpc.html, Elasticvapor Blog, May 9, 2008, (3 pages).

Harney, Eric, et al., "The efficacy of live virtual machine migrations over the internet," in Proceedings of the 3rd international workshop on Virtualization technology in distributed computing, pp. 1-7, Reno, Nevada, Nov. 12, 2007, ACM, (7 pages).

Huang, Wei, et al., "High performance virtual machine migration with RDMA over modern interconnects," in Proceedings of the 2007 IEEE International Conference on Cluster Computing, pp. 11-20, IEEE Computer Society, Sep. 17, 2007, (10 pages).

Microsoft, "Microsoft hyper-v server," www.microsoft.com/hyper-v-server, 2008, (2 pages).

Jin, Hai, et al., "Live virtual machine migration with adaptive memory compression," in Cluster, Sep. 3, 2009, (28 pages).

Milos, G., et al., "Satori: Enlightened page sharing," in USENIX Annual Technical Conference, Jun. 14, 2009, (14 pages).

Morris, R., "Scalable TCP congestion control," in INFOCOM 2000, Nineteenth Annual Joint Conference of the IEEE Computer and Communications Societies. Proceedings. IEEE, vol. 3, pp. 1176-1183, Mar. 26, 2000, (8 pages).

Nelson, Michael, et al., "Fast transparent migration for virtual machines." in ATEC '05: Proceedings of the annual conference on USENIX Annual Technical Conference, Apr. 10, 2005, (4 pages).

(56) References Cited

OTHER PUBLICATIONS

Carnegie Mellon University School of Computer Science, "Sliding window based rabin fingerprint computation library," www.cs.cmu.edu/~hakim/software, Dec. 2, 2005, (1 page).
Ruth, P., et al., Autonomic live adaptation of virtual computational environments in a multi-domain infrastructure, In ICAC '06: Proceedings of the 2006 IEEE International Conference on Aunomic Computing, Washington, DC, USA, Jun. 12, 2006 (10 pages).
Spec.org, "The spec java server benchmark," http://spec.org/jbb2005/, Jun. 16, 2005, (2 pages).
Spring, Neil, et al., "A protocol-independent technique for eliminating redundant network traffic," SIGCOMM Comput. Commun. Rev., 30(4): 87-95, Aug. 28, 2000. (9 pages).
Sundararaj, Ananth, et al., "Towards virtual networks for virtual machine grid computing," In VM'04: Proceedings of the 3rd conference on Virtual Machine Research and Technology Symposium, May 6, 2004, (14 pages).
TPC, The TPC-W benchmark, http://www.tpc.org/tpcw/, Feb. 1, 2000 (1 page).
Travostino, Franco, et al., "Seamless live migration of virtual machines over the MAN/WAN," Future Generation Computer Systems, 22(8):901-907, Oct. 2006 issue (posted online Jun. 7, 2006), (10 pages).
Waldspurger, Carl A., "Memory resource management in VMware ESX server," In OSDI '02: Proceedings of the 5th symposium on operating systems design and implementation, p. 181194, New York, NY, USA, Dec. 9, 2002, ACM, (14 pages).
Wood, T., et al., "The case for enterprise ready virtual private clouds," In Proceedings of the Usenix Workshop on Hot Topics in Cloud Computing (HotCloud, San Diego, CA), Jun. 14, 2009, (5 pages).
Ramakrishnan et al., "Live Data Center Migration Across WANs: A Robust Cooperative Context Aware Approach," in INM '07: Proceedings of the SIGCOMM workshop on Internet network management, Aug. 27, 2007, (6 pages).
VMware, "VMware vSphere: VMware vMotion for Live Migration of Virtual Machines," http://www.vmware.com/products/vmotion/, Sep. 15, 2008 (2 pages).
VMware, "Virtualization Basics: Virtual Machines, Virtual Server, Virtual Infrastructure," First published on Nov. 12, 2009, as archived at http://web.archive.org/web/20091112211022/http://www.vmware.com/virtualization/virtual-machine.html, (2 pages).
Van Der Merwe et al., "Dynamic Connectivity Management with an Intelligent Route Service Control Point," AT&T Labs, Proceedings of the 2006 SIGCOMM Workshop on Internet Network Management, held on Sep. 11, 2006, (6 pages).
Van Der Merwe et al., PowerPoint presentation of "Dynamic Connectivity Management with an Intelligent Route Service Control Point," AT&T Labs, Proceedings of the 2006 SIGCOMM Workshop on Internet Network Management, held on Sep. 11, 2006, (6 pages).
Brady, Kevin F., "Cloud Computing—Is It Safe for IP?" Portfolio Media, Inc., http://www.law360.com/print_article/113709 on Aug. 27, 2009. Retrieved from the Internet on Sep. 3, 2009, (8 pages).
Google, "Google App Engine" http://code.google.com/appengine/, Apr. 7, 2008, (4 pages).
U.S. Office Action dated Mar. 28, 2012 in U.S. Appl. No. 12/638,643.
U.S. Office Action dated May 11, 2010 in U.S. Appl. No. 12/262,675.
U.S. Office Action dated Oct. 4, 2010 in U.S. Appl. No. 12/262,675.
U.S. Office Action dated Apr. 15, 2011 in U.S. Appl. No. 12/262,675.
U.S. Notice of Allowance dated Oct. 17, 2011 in U.S. Appl. No. 12/262,675.
U.S. Office Action dated Mar. 13, 2012 in U.S. Appl. No. 12/262,615.
Rosen, et al., "BGP/MPLS IP Virtual Private Networks (VPNs)," Network Working Group, Request for Comments: 4364, The Internet Society, Feb. 2006, 44 pages.
U.S. Office Action dated Sep. 19, 2012 in U.S. Appl. No. 12/638,643.
U.S. Office Action dated Oct. 4, 2012 in U.S. Appl. No. 12/262,615.
Cisco: IPv6 over MPLS Cisco IPv6 Provider Edge Router (6PE) Cisco IPv6 VPN Provider Edge Router (6VPE); 2006.
U.S. Office Action dated Apr. 10, 2013 in U.S. Appl. No. 12/638,643.
U.S. Notice of Allowance dated Feb. 20, 2013 in U.S. Appl. No. 12/262,615.
U.S. Office Action dated May 13, 2014 in U.S. Appl. No. 13/349,305.

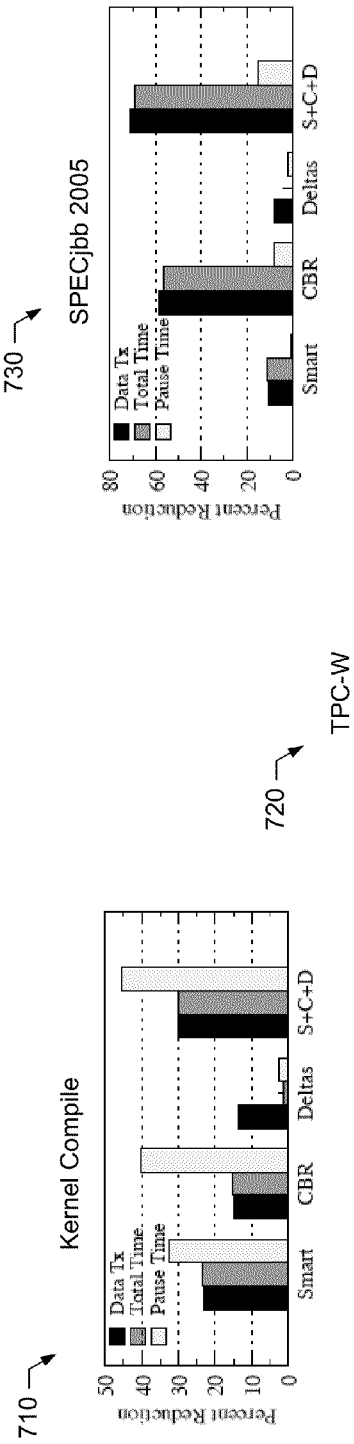
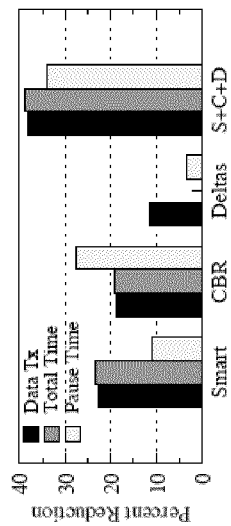
FIG. 6
FIG. 7

|  | Data Transfer (MB) | | Page Delta |
|---|---|---|---|
|  | Iter 1 | Iters 2-30 | Savings (MB) |
| TPC-W | 954 | 315 | 172 |
| Kernel | 877 | 394 | 187 |
| SPECjbb | 932 | 163 | 127 |
FIG. 8
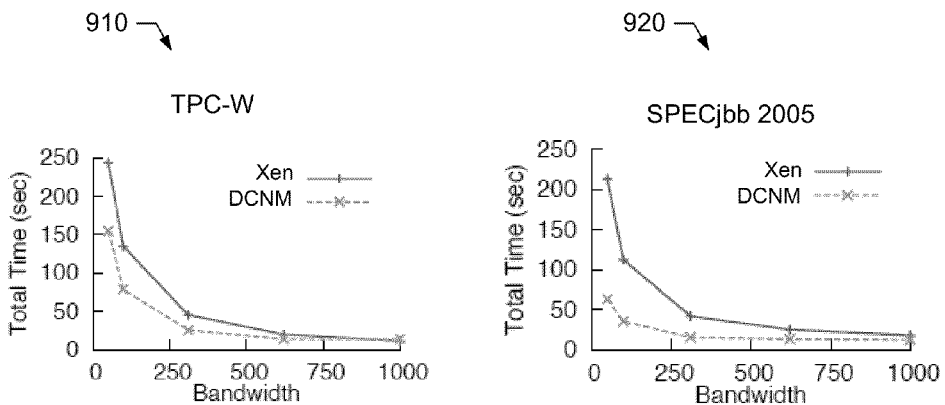
FIG. 9
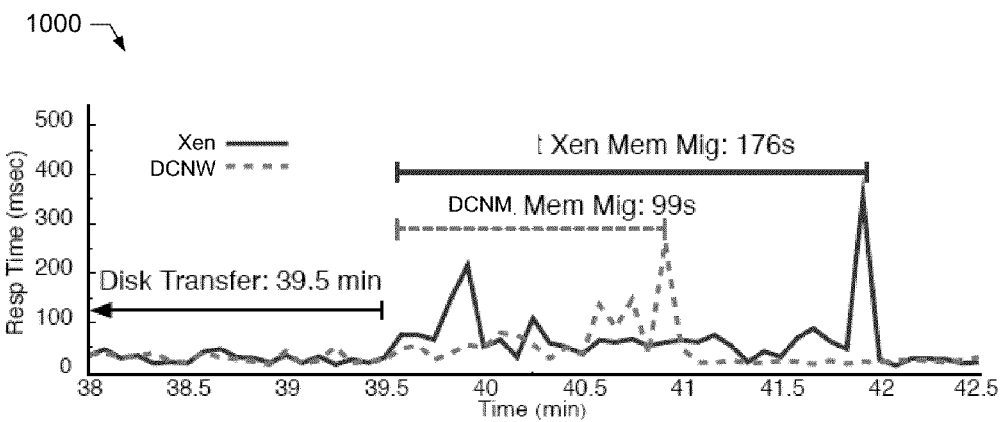
FIG. 10

METHODS AND APPARATUS TO MIGRATE VIRTUAL MACHINES BETWEEN DISTRIBUTIVE COMPUTING NETWORKS ACROSS A WIDE AREA NETWORK

CROSS-REFERENCE TO RELATED APPLICATIONS

This application is a continuation of U.S. patent application Ser. No. 12/862,382, filed Aug. 24, 2010, now U.S. Pat. No. 8,473,557, entitled "Methods and Apparatus to Migrate Virtual Machines Between Distributive Computing Networks Across a Wide Area Network," which is incorporated herein by reference in its entirety.

TECHNICAL FIELD

This disclosure relates generally to cloud computing and, more particularly, to methods and apparatus to migrate virtual machines between distributive computing networks across a wide area network.

BACKGROUND

Cloud computing platforms are becoming popular with clients and customers by providing flexible on-demand resources at a relatively low cost. A cloud computing network, also known as a distributive computing network, enables clients to manage web-based applications and/or data resources by dynamically leasing computational resources from service providers. These web-based applications and/or data resources may be used by customers of the clients, individuals associated with the clients, and/or by the clients. This dynamic leasing of computational resources creates an appearance and functionality of a distributive computing network and, thus, can be referred to as virtualization of a computer network. Cloud computing platforms utilize virtualization of network and/or computing resources. Accordingly, new resources provisioned for a client may be quickly added as needed within short periods of time by a service provider allocating an additional portion of shared resources to the client. Additionally, virtualization in cloud computing enables service providers to dynamically multiplex resources among multiple clients without dedicating individual physical resources to each client.

Service providers may migrate resources to different geographic locations based on a number of factors. Some of these factors may include, for example, moving resources closer to client sites, moving resources closer to customers, consolidating resources, expanding resources, or changing service providers. In many of these examples, resources may have to be migrated across a wide area network (e.g., the Internet). However, this migration may be relatively slow due to the amount of data to be transferred or the bandwidth available between cloud computing platforms. In some of these examples, the resources may be unavailable to a client during the migration.

BRIEF DESCRIPTION OF THE DRAWINGS

FIG. 6 shows a chart of migration performance for different applications operated by a virtual machine.

FIG. 7 shows graphs that illustrate an improvement in migration performance of the distributive computing network manager of FIGS. 1, 2 and 5 compared to a Xen system.

FIG. 8 shows a chart of data transferred for different copy iterations.

FIG. 9 shows example graphs of a total time to transfer a virtual machine with the example distributive computing network manager of FIGS. 1, 2, and 5 and the Xen system.

FIG. 10 shows an example graph of response time of a TPC-W application during a disk state transfer and a memory state transfer by the distributive computing network manager 132 of FIGS. 1, 2, and 5 and the Xen system.

DETAILED DESCRIPTION

Figure 1:
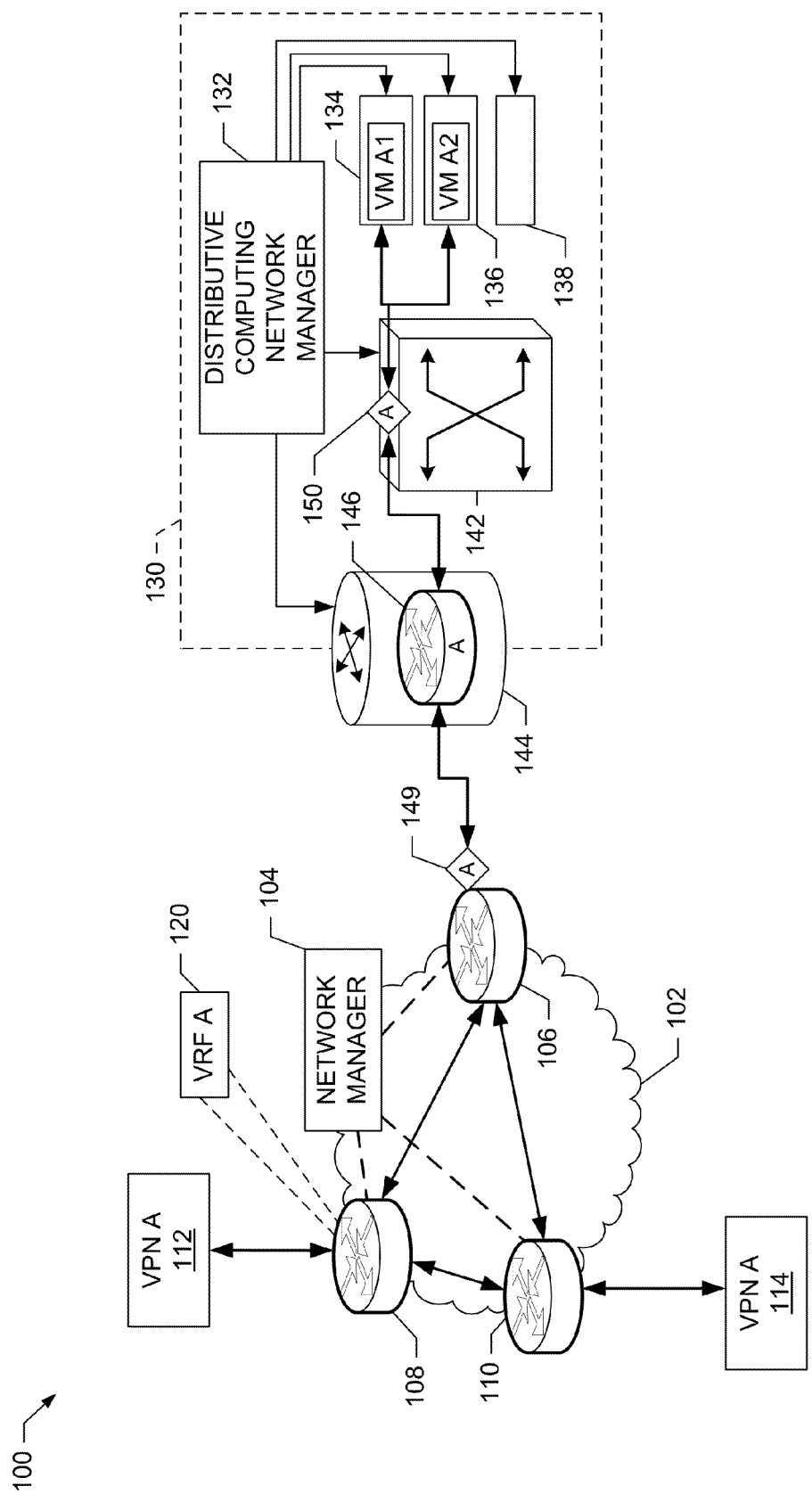
FIG. 1 is a schematic illustration of an example communication system including a client virtual private network (VPN) and a distributive computing network.

Example methods, articles of manufacture, and apparatus to migrate virtual machines between distributive computing networks across a wide area network are disclosed. A disclosed example method includes establishing a data link across a wide area network between a first distributive computing network and a second distributive computing network, the first distributive computing network including a virtual machine operated by a first host communicatively coupled to a virtual private network via a first virtual local area network. The example method also includes communicatively coupling a second host included within the second distributive computing network to the virtual private network via a second virtual local area network and migrating the virtual machine via the data link by transmitting a memory state of at least one application on the first host to the second host while the at least one application is operating.

A disclosed example apparatus includes a distributive computing network manager to establish a data link across a wide area network between a first distributive computing network and a second distributive computing network, the first distributive computing network including a virtual machine operated by a first host communicatively coupled to a virtual private network via a first virtual local area network. The example apparatus further includes a memory transferor to migrate the virtual machine via the data link to a second host included within the second distributive computing network by transmitting a memory state of at least one application on the first host to the second host while the at least one application is operating.

In addition to migrating a virtual machine, the example methods and apparatus described herein may also migrate stored data (e.g., a disk state) associated with the virtual machine. In this manner, the methods and apparatus described herein enable a service provider to integrate the migration of a virtual machine with the migration of data utilized by the virtual machine. This integrated migration enables a service provider to initially asynchronously copy data and then synchronously copy the virtual machine and associated data to reduce a time the virtual machine is unavailable.

Distributive computing networks (e.g., cloud computing networks) enable subscribing clients to flexibly lease virtual servers based on customer usage and/or individual client usage. The distributive computing networks are typically used for software-as-a-service (SaaS) web-based front-end applications (e.g., online retail businesses) and/or infrastructure-as-a-service (IaaS) data processing applications. Distributive computing networks may also be used for computing-as-a-service (CaaS) applications and storage-as-a-service database management applications. The distributive computing networks are managed by service providers who may allocate resources among the distributive computing networks based on usage or demand. These resources may be allocated as virtual machines that utilize the computing resources of one or more servers (e.g., hosts).

Generally, distributive computing network service providers manage storage and/or computing resources. Customers and/or clients may utilize the storage and/or computing resources, but are not provided the functionality by these service providers to control network resources within the distributive computing network and/or network resources linking the customer and/or client to the distributive computing network. The customers and/or clients may include enterprise clients that manage and/or are associated with a virtual private network (VPN). However, some enterprise clients may require a distributive computing network service provider to link applications operating within the client site to virtual machines hosted by distributive computing network using an IP address and/or an IP address space associated with the enterprise client. Furthermore, many enterprise clients may utilize VPNs that have static IP addressing for routing Internet and/or Intranet-based communications. For enterprise clients that may implement a dynamic network (e.g., a VPN and/or a virtual local area network (VLAN)), typical connections to virtual machines may require the enterprise clients to constantly map their network resources to the corresponding virtual machines. As a result, the additional resources used by an enterprise client to constantly update network mapping to virtual machines and/or to maintain security associated with the mapping may exceed resources saved by the enterprise client utilizing the virtual machines.

Currently, dynamic IP addresses implemented within distributive computing networks create a separation between the address space of a client and IP addresses assigned to a virtual machine. While this separation isolates client resources from being viewed by a third party, this separation increases configuration complexity when a client deploys services that may communicate between the enterprise VPN address space and virtual machines operating within the distributive computing network IP address space. Additionally, the IP address separation requires a client to be responsible for independently arranging for network traffic isolation and/or bandwidth guarantees with a service provider of the distributive computing network.

Further, servers within distributive computing networks may host resources by storing a disk state and/or a memory state for each resource. For example, an application operated by a virtual machine and stored on a server may have a disk space that corresponds to stored computer code of the application. This stored computer code (e.g., disk state) may include any files, licenses, and/or data for operating the application. In some examples, the disk state may be stored on Random Access Memory (RAM), Read Only Memory (ROM), and/or any other type of memory. The application may also include a memory space that corresponds to application data associated with a file, session, and/or usage (e.g., a memory state) of the application. The memory state may be stored in RAM and/or any other type of memory because the contents of the application may change frequently. For example, a word processing program may be stored within the disk space while a word processing document editable via the word processing program may be stored within the memory space. In another example, a database program and baseline database data may be stored within the disk space while modifications, deletions, and/or additions to the data may be stored within a memory space.

Distributive computing networks may be localized at different global locations to take advantage of energy costs, infrastructure, labor, and/or client workload metrics. In some instances, service providers may migrate and/or transfer resources (e.g., disk states and/or memory states of applications) between distributive computing network locations and/or sites. For example, service providers may transfer resources to other locations based on changing conditions of a subscribing client (e.g., to move resources closer to a client site or to move resources to a different service provider). In other examples, a service provider may have to dynamically migrate resources between different sites as client workloads or costs change. Currently, many of these service providers may only migrate the memory state of resources because the different distributive computing network locations may share file systems. As a result, many service providers may not migrate resource disk states.

Because many distributive computing network locations may pool resources within a local area network (LAN), resource migration methods may be optimal for LAN networks (e.g., networks with high bandwidth between hosts, low routing latency, and/or low data propagation times). However, these methods may not be efficient for migrating resources between different distributive computing network sites across a wide area network (WAN). For example, data migration via a WAN may include data traversal through tens of routers over thousands of miles through relatively low bandwidth data links. Despite some data links having gigabit capacity, network routers may, for example, only allocate a single data link 100 megabits per second (Mbps). Additionally, many virtual machines may be concurrently migrated in parallel over the same data link, thereby reducing available capacity for the migration of each virtual machine. As a result, data migration may range from a few minutes to a few hours depending on the amount of data to be migrated. Further, in many examples, applications operated by the virtual machines may be paused during a portion of the migration. The pause time may range from a few seconds to a few hours. As resources become increasingly utilized at different locations, WAN migration changes the scale of provisioning distributive computing network hosts from shared servers within a rack to groups of servers at multiple data centers.

The example methods, articles of manufacture, and apparatus described herein enable service providers to migrate resources between different distributive computing networks locations (e.g., sites) by providing a client access to hosted resources through a VLAN that is communicatively coupled to a VPN of a client across a WAN. In this manner, clients may securely access resources hosted on a virtual machine through an isolated dedicated link between their VPN to the virtual machine via the VLAN. Because the resources are hosted via a VLAN, the resources (e.g., the disk state and the memory state) may be migrated to other distributive computing network sites across a WAN using LAN-based protocols. The example methods, apparatus, and articles of manufacture utilize optimizations to further improve performance and efficiency of WAN resource migration.

These optimizations may include, for example, transferring a disk state of a virtual machine asynchronously for a period of time before transferring the remaining disk state synchronously. The example optimizations may also include transferring a memory state of a virtual machine by iteratively determining an optimal number of memory page transmissions prior to temporarily halting an application to transfer the remaining memory pages. The example memory state optimizations may also include content-based redundancy messages that transmit index locations of previously transferred data. The example memory state optimizations may further include using page deltas to track changes to a memory state of a virtual machine and migrating only the changes to the new host. In some examples, the page delta optimization may be implemented with the content-based redundancy optimization to reduce a total amount of data transferred, thereby reducing bandwidth consumed to transfer a memory and a disk state. In these examples, the combination of the page delta optimization and the content-based redundancy optimization may also reduce a number of round-trip times (e.g., when using Transmission Control Protocol (TCP)) between a local and a remote site, thereby reducing an impact of a relatively long latency between the sites.

With this relatively efficient migration and storage of virtual machines and corresponding data implemented by the example methods, articles of manufacture, and apparatus described herein, service providers may easily and/or transparently use servers available at multiple data centers. As a result, service providers may aggregate the servers into a group that may be used by one or more clients. Alternatively, the group of servers may be used by a service provider to optimize an allocation of resources distributed among the virtual machines that will operate at all of the data centers.

In the interest of brevity and clarity, throughout the following disclosure, reference will be made to an example communication system 100 of FIG. 1. However, the methods, articles of manufacture, and apparatus described herein to migrate virtual machines between distributive computing networks across a WAN are applicable to other types of networks constructed using other network technologies, topologies and/or protocols.

FIG. 1 illustrates the example communication system 100 that includes a switching network 102. The switching network 102 may include any multiprotocol label switching (MPLS) to implement a layer 3 VPN, a Virtual Private LAN Service (VPLS) to implement a Layer 2 VPN across a WAN, and/or any other type of switching service to implement a VPN. The switching network 102 is managed by a network manager 104 that configures routing tables for routers 106-110. The example switching network 102 may include any type of network managed by a service provider for routing packet-based communications (e.g., data) between computing resources associated with client sites. In some examples, the switching network 102 may be implemented by multiple service providers.

The routers 106-110 of the illustrated example route packet-based communications between systems and networks utilizing a VPN A located at a first location 112 and a second location 114 corresponding to a subscribing client A. In other examples, the routers 106-110 may route other packet-based communications to and/or from other clients and/or customers (not shown) and other switching networks (not shown). The routers 106-110 may be provider edge (PE) routers that may be communicatively coupled to each other and/or the VPNs at the locations 112-114 via any number and/or type(s) of communication paths (not shown) that allow any particular router 106-110 to communicate with at least some, but not necessarily all of, the other routers 106-110. Furthermore, each of the VPNs at the locations 112-114 may include customer edge (CE) routers (not shown) that may route packet-based communications between computing sources within the respective VPNs at the locations 112-114. The VPNs at the locations 112-114 may be implemented by any type of virtualized network that communicatively couples computing resources from one or more client sites together.

For the VPN A at the locations 112-114 implemented by the switching network 102, each of the example routers 106-110 of FIG. 1 has a VPN routing and forwarding (VRF) table. For example, for the VPN A at the locations 112 and 114, the routers 106-110 have a VRF table A 120. For brevity, only the VRF table A 120 associated with the router 108 is shown. However, the routers 106 and 110 each include a VRF table A 120. The VRF table A 120 is used by each of the routers 106-110 to route and/or forward a packet received at a particular router 106-110 toward its final destination. In general, when a packet is received at the router 106-110 from a router associated with a particular VPN at the locations 112-114, the router 106-110 uses the final destination identified in the packet to perform a query of the VRF table associated with that VPN. Based on a result of the query, the routers 106-110 determine how the packet is to be routed or forwarded within the switching network 102 and/or delivered to a particular CE router within another VPN and/or client site.

The example network manager 104 of FIG. 1 manages the VRF A 120 in the routers 108 and 110 for the VPN A at the locations 112-114. The example network manager 104 may include a network configuration management system that configures and/or creates VRF tables for VPNs (e.g., to manage the control plane of the routers 106-110). Additionally, the network manager 104 may include a route reflector, route server, and/or a route controller that writes and rewrites route targets associated with VPN routes so that a client VPN can be dynamically connected to a selected VRF table (e.g., to manage the route within the routers 106-110). In other examples, the route reflector, route server, and/or route controller may be separate from the network manager 104. In some examples, the network manager 104 may pre-configure the routers 106-110 with one or more sets of VRF tables. The one of more sets of VRF tables may be unspecified and/or unused by the routers 106-110 until the network manager 104 selects a set to couple a client VPN to a virtual machine (e.g., virtual machine VM A1 in a distributive computing network 130). Alternatively, the one or more sets of VRF tables may be selective based on configurations of the client VPN. For example, the VRF A 120 may include tables created by the network manager 104 to communicatively couple the VPN A at the locations 112 and 114. Then, when the virtual machine VM A1 is created, the network manager 104 adds entries within the VRF A 120 to communicatively couple the VPN A at the locations 112 and 114 to the virtual machine VM A1.

For example, the network manager 104 may receive routing instructions from the client A regarding a new VPN A site. The network manager 104 may then update (e.g., configure) the VRF A 120 to include the new VPN A site. The network manager 104 may then rewrite route targets within the routers 106-110 associated with VPN A routes to dynamically couple the new VPN A site to the locations 112 and 114. The example network manager 104 may publish one or more interfaces associated with routers for forwarding packets to other switching networks or distributive computing networks. Additionally, the network manager 104 may be communicatively coupled to each of the routers 106-110 via any type of communication path that may include one or more intermediate networks and/or nodes as indicated by the dashed lines.

By sending, for example, Border Gateway Protocol (BGP) route advertisements, each of the example routers 106-110 of FIG. 1 publishes and/or exports information concerning routes advertised by CE router(s) within the VPNs at the locations 112-114 that are communicatively coupled to the routers 106-110. Isolation between the VPN A and other VPNs is achieved via VRF tables (e.g., the VRF A 120), and/or import policies. Specifically, all routes of a particular VPN are tagged with a route target parameter and/or value associated with the VPN. For example, when the example router 108 sends a BGP advertisement containing information regarding routers within the VPN A at the first location 112 that is communicatively coupled to the router 108, the BGP advertisement includes a route target that is associated with the VPN A. Based on received BGP advertisements, the example routers 106-110 of FIG. 1 build, compile, update, maintain and/or construct a VRF table (e.g., the VRF A 120) for each VPN. Specifically, when the example routers 106-110 receive BGP advertisements tagged with a route target associated with a particular VPN, they import only those routes into the VRF table associated with that VPN, as dictated by the VPN's import policy.

To facilitate sharing of routing information among the example routers 106-110, the example network manager 104 of FIG. 1 may include any number of route reflectors, route servers, intelligent route reflectors, and/or intelligent route service control points. Because not all of the example routers 106-110 are necessarily communicatively coupled in a full mesh topology (for example, when at least one router 106-110 does not have a direct communication path to another router 106-110), the example network manager 104 of FIG. 1 forwards BGP advertisements among the routers 106-110. By forwarding each received BGP advertisement, the example network manager 104 enables each of the routers 106-110 to build, compile and/or construct a VRF table for each VPN that can be used by the router 106-110 to route data from any CE router of a particular VPN to any other CE router within the VPN A, even if such routing of data requires use of one or more intervening routers 106-110.

In the example of FIG. 1, the communication system 100 includes the distributive computing network 130 that is communicatively coupled to the switching network 102 via the router 106. The distributive computing network 130 may include any type of virtualized network that includes servers that provide resources to clients and/or customers based on, for example, usage requirements, bandwidth, processor efficiency, etc. In some examples, the distributive computing network 130 may include a cloud computing network. The example distributive computing network 130 is managed by a distributive computing network manager 132 to create, allocate, and/or distribute resources within the distributive computing network 130. The distributive computing network 130 further includes servers 134-138 for hosting computing resources, a virtual local area network (VLAN) switch 142, a router 144 that includes a logical router 146, and virtual machines VM A1 and VM A2 respectively hosted by the servers 134 and 136. The virtual machines VM A1 and VM A2 may be operated using a Xen virtualization platform on the servers 134 and 136. Additional virtual machines (not shown) may also reside on the servers 134 and 136. Each of the servers 134-138 may be located within a single site location or, alternatively, may be located at a plurality of site locations within the distributive computing network 130. Additionally, the distributive computing network 130 may include other routers, logical routers, servers, VLANs, and/or switching networks that may be distributed across one or more sites located at different physical locations.

The example communication system 100 of FIG. 1 shows the VPN A at the locations 112 and 114 communicatively coupled to virtual machines VM A1 and VM A2 within the distributive computing network 130. The router 106 includes an interface 149 that communicatively couples the VPN A at the locations 112 and 114 to resources (e.g., the disk state and memory state of the virtual machines VM A1 and A2 respectively hosted by the servers 134 and 136) within the distributive computing network 130. The interface 149 may communicatively couple the VPN A at the locations 112 and 114 to the virtual machines VM A1 and A2 by remapping the route targets associated with the VPN A in the VRF A 120 to the virtual machines VM A1 and A2 and transmitting BGP advertisements to the routers 108 and 110 with the remapped route target. The interface 149 may be coupled to a VRF table that includes a routing entry that forwards packets from multiple destinations associated with the VPN A to a single (or few) network locations within the distributive computing network 130. The example router 106 may include additional interfaces and/or endpoints that reference other distributive computing networks and/or other switching networks.

The example VLAN switch 142 communicatively couples common resources together that may be distributed across each of the servers (e.g., the servers 134 and 136) and/or by isolating resources associated with different clients that may be shared on a single router. The VLAN switch 142 implements one or more VLANs that may communicatively couple virtual machines to VPNs. For example, the virtual machines VM A1 and VM A2 may be a group of resources distributed across the servers 134 and 136. The example VLAN switch 142 couples the virtual machine VM A1 and VM A2 on the respective servers 134 and 136 together so that any computing resource within the VPN A at the location(s) 112 and/or 114 may access an application, data, and/or a processing resource by accessing the virtual machine VM A1, VM A2, and/or a combination of the virtual machines VM A1 and VM A2.

The virtual machines VM A1 and/or VM A2 may include any type of hardware virtual machine that may share underlying hardware resources with each resource operating a separate operating system. The virtual machines VM A1 and/or VM A2 may also include any type of application virtual machine that may operate different client applications on a single operating system. A virtual machine (e.g., the virtual machine VM A1) may be hosted by a single server (e.g., the server 134) and/or by multiple servers that may be located within the same and/or across different physical locations. In some examples, an application may be operated by multiple virtual machines on multiple servers, where each of the servers may be located at different physical locations. Each of the virtual machines VM A1 and VM A2 may be assigned an IP address and/or a logical interface of each virtual machine may be assigned a media access control (MAC) address.

The example distributive computing network manager 132 may assign an IP address and/or an IP address space to each of the virtual machines VM A1 and/or VM A2 or, alternatively, may assign a single IP address and/or IP address space to the virtual machines VM A1 and VM A2 collectively. Further, the distributive computing network manager 132 may assign resources, application types, application images, access control, bandwidth, operating system types, a server location, and/or any other type of distributive computing parameter to one or more servers upon a request to provision and/or allocate resources from a client. In other examples, the distributive computing network manager 132 may assign a MAC address to the virtual machines VM A1 and/or VM A2.

The distributive computing network manager 132 may also partition resources within the router 144 by creating a logical router (e.g., the logical router 146). The logical router 146 functions as a customer edge router for the VLAN within the distributive computing network 130. In this manner, the client A VPN sites (e.g., the locations 112 and 114) are communicatively coupled to resources in the distributive computing network 130 so that traffic from the client locations 112 and 114 with destination addresses associated with the virtual machines VM A1 and/or VM A2 can reach these virtual machines. These destination addresses correspond to the IP addresses of the virtual machines VM A1 and VM A2 and/or may correspond to a MAC address assigned to an interface of the virtual machines VM A1 and VM A2. The logical router 146 may also include filters and/or firewalls to restrict access to resources within the distributive computing network 130. For example, the logical router 146 may include a source address filter so that only packets that include a source address associated with the VPNs at the locations 112 and 114 may be forwarded to the virtual machines VM A1 and VM A2.

The distributive computing network manager 132 may also update VRF tables within the router 144 to include identification values of network paths within the VLAN switch 142 that correspond to routes to virtual machines VM A1 and VM A2. A VLAN controller (not shown) may manage the physical and/or logical setup of a network path from the servers 134-138 to the logical router 146. For example, a VLAN network path 150 from the virtual machine VM A1 may be assigned an identification value of PATH1. Further, the virtual machine VM A1 may be assigned an IP address ADDR01. The distributive computing network manager 132 may create a VRF table via the logical router 146 that indicates any packets originating from the VPN A at the locations 112 and 114 with a destination address of ADDR01 should be forwarded to the virtual machine VM A1 on the server 134 via the VLAN network path PATH1 150.

The example distributive computing network manager 132 of FIG. 1 may also be used to change and/or modify virtual machines in response to requests from clients. In these examples, the distributive computing network manager 132 may change the routing of VLAN paths, the partitioning of IP address space within the router 144, and/or the partitioning of hosting resources of the servers 134-138 as requested by the clients. Furthermore, the distributive computing network manager 132 may migrate the virtual machines and/or resources between servers. While the distributive computing network manager 132 is shown as a centralized entity, in other examples, the distributive computing network manager 132 may be implemented in a distributive manner among the servers 134-138, the switch 142, and/or the router 144. In yet other examples, the distributive computing network manager 132 may be implemented in a hybrid centralized/distributive manner within the distributive computing network 130.

Figure 2:
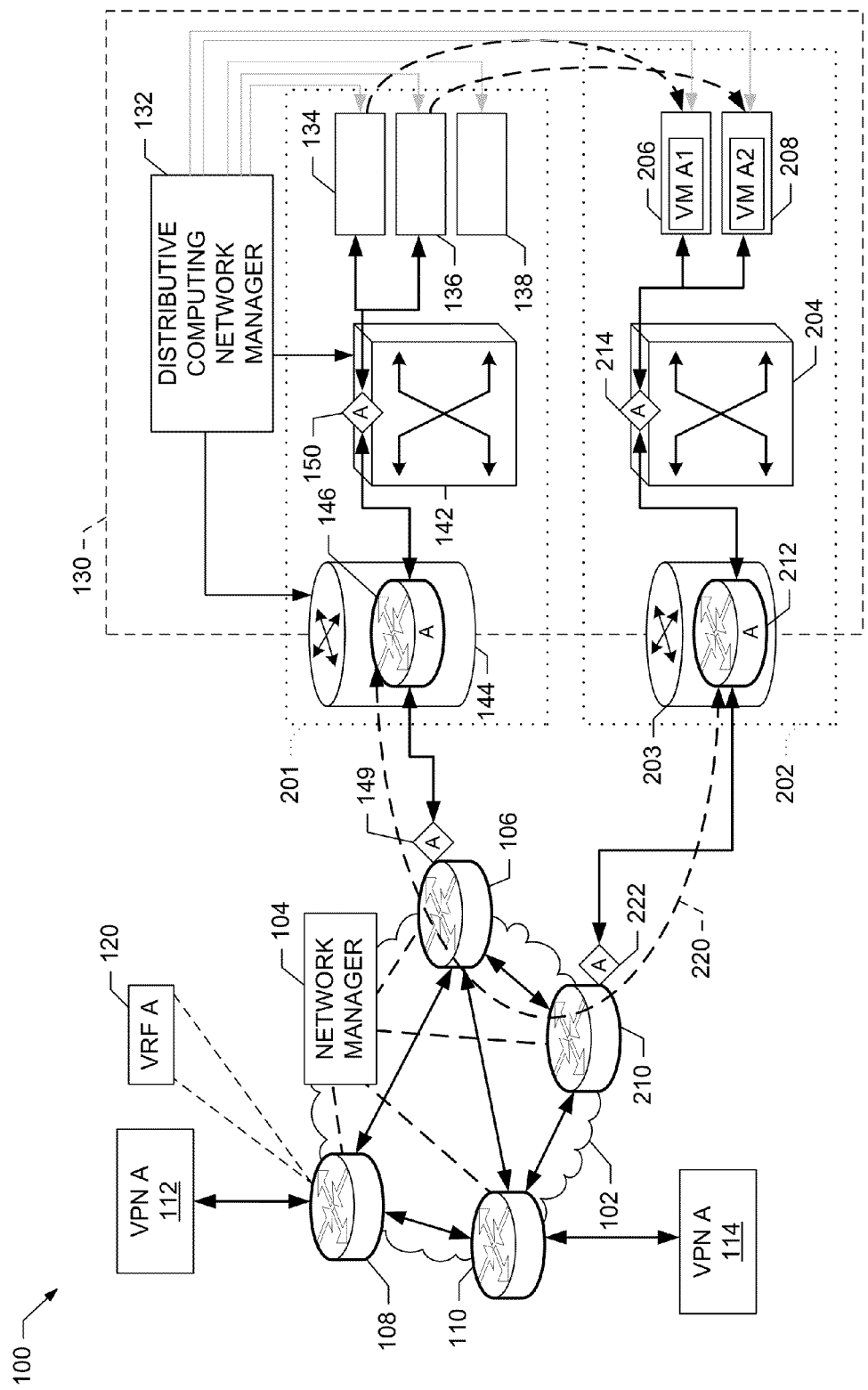
FIG. 2 shows the example communication system of FIG. 1 with virtual machines migrated from a first site to a second site.

FIG. 2 shows the example communication system 100 of FIG. 1 including first and second sites 201 and 202. The second site 202 includes a second router 203, a second VLAN switch 204 and servers 206 and 208. In this example, the router 144, the VLAN switch 142 and the servers 134-138 of FIG. 1 are located at the first site 201 within the distributive computing network 130. The different sites 201 and 202 may be different data centers and/or different enterprise sites separated by a WAN (e.g., the switching network 102). The example distributive computing network manager 132 is communicatively coupled to and manages the servers 206 and 208, the second VLAN switch 204, and the second router 203. Further, the second router 203 is communicatively coupled to the switching network 102 via a router 210. The router 210 is shown communicatively coupled to the routers 106 and 110 and the example network manager 104. The router 210 may also be communicatively coupled to other routers within the switching network 102 and/or the VPN A at the locations 112 and 114. The example router 210 may also include the VRF A 120 (not shown).

The example in FIG. 2 shows a migration of the virtual machine VM A1 from the server 134 at the first site 201 to the server 206 at the second site 202 and a migration of the virtual machine VM A2 from the server 136 at the first site 201 to the server 208 at the second site 202. The virtual machines VM A1 and VM A2 may be moved to the second site 202 upon a request from the client A associated with the VPN A at the locations 112 and 114. For example, the client A may request migration of the virtual machines VM A1 and VM A2 to improve transmission latency between the virtual machines VM A1 and VM A2 and the VPN A at the locations 112 and 114. Alternatively, the virtual machines VM A1 and VM A2 may be moved to the second site 202 by the distributive computing network manager 132 to balance resource usage between the sites 201 and 202. In yet other examples, the distributive computing network manager 132 may migrate the virtual machines VM A1 and VM A2 based on issues at the first site 201. In other examples, only one of the virtual machines VM A1 or VM A2 may be migrated to the second site 202 and/or a different site (not shown).

The example distributive computing network manager 132 manages the migration of the virtual machines VM A1 and VM A2 from the first site 201 to the second site 202 without affecting communication between the virtual machines VM A1 and VM A2 and the VPN A at the locations 112 and 114 (e.g., the migration may be transparent to the client A). The example distributive computing network manager 132 manages the migration by initializing the second site 202 for the migration. The distributive computing network manager 132 initializes the second site 202 by determining and allocating servers to host the virtual machines VM A1 and VM A2 (e.g., the servers 206 and 208). The distributive computing network manager 132 may also partition IP address space associated with the virtual machines VM A1 and VM A2 within the second router 203 at the site 202 to create a logical router 212 and/or cross reference the IP address space in the logical router 212 to the source IP address space associated with the VPN A at the locations 112 and 114. Additionally or alternatively, the IP address space in the logical router 212 may be cross referenced to a route target associated with the VPN A routes. The example distributive computing network manager 132 further initializes the second site 202 by creating a second VLAN path 214 within the second VLAN switch 204 from the servers 206 and 208 to the logical router 212.

Upon initializing the second site 202 for the virtual machines VM A1 and VM A2, the example distributive computing network manager 132 of FIG. 2 creates a VPLS VPN 220 (e.g., a layer-2 data link) from the logical router 212 to the logical router 146 via the routers 210 and 106 within the switching network 102. The VPLS VPN 220 couples the VLAN 150 at the first site 201 with the second VLAN 214 at the second site 202. By linking together the VLANs 150 and 214, the example distributive computing network manager 132 creates a virtual network that routes traffic from the VPN A at the locations 112 and 114 to the virtual machines VM A1 and VM A2 regardless of the location of the virtual machines VM A1 and VM A2. This virtual link is also used to migrate a disk state and a memory state of the virtual machines VM A1 and VM A2 from the first site 201 to the second site 202. Upon creating the VPLS VPN 220, the distributive computing network manager 132 migrates the virtual machines VM A1 and VM A2 from the servers 134 and 136 at the first site 201 to the servers 206 and 208 at the second site 202.

The example distributive computing network manager 132 migrates the virtual machines VM A1 and VM A2 by transferring a copy of a disk state and/or a copy of a memory state. The disk and memory states are associated with application(s) operating via the virtual machines VM A1 and VM A2. The distributive computing network manager 132 transfers the virtual machines VM A1 and VM A2 to the second site 202 so that the client A at the locations 112 and 114 experiences minimal downtime of the applications. In other words, the distributive computing network manager 132 migrates as much disk state and memory state as possible before temporarily pausing (e.g., for a few seconds) applications to transfer a final memory state to the second site 202. Once the final memory state is transferred to the servers 206 and 208, the virtual machines VM A1 and VM A2 may continue operating. In some examples, the distributive computing network manager 132 may migrate the virtual machines VM A1 and VM A2 without a loss of service to the client A by using the VPLS VPN 220 to transfer connections between the VPN A at the locations 112 and 114 from the servers 134 and 136 to the servers 206 and 208. In these examples, the distributive computing network manager 132 may transfer service upon the virtual machines VM A1 and VM A2 being transferred.

In some examples, the distributive computing network manager 132 may transfer disk state using a global storage area network (SAN) that stores disk state at a location separate from the first and the second sites 201 and 202. Because the disk state is stored remotely, the distributive computing network manager 132 may access a SAN to download the disk state of the virtual machines VM A1 and VM A2 to the servers 206 and 208. Alternatively, if the disk state is not stored on a SAN, the distributive computing network manager 132 may transfer disk state by asynchronously (e.g., via a Distributed Replicated Block Device (DRBD) storage migration system) performing an iterative pre-copy of the disk state and transmitting the copied disk blocks to the servers 206 and 208. The distributive computing network manager 132 may then transfer changes to the disk state to the servers 206 and 208 synchronously as the virtual machines VM A1 and VM A2 update the disk state at the servers 134 and 136. In other examples, the distributive computing network manager 132 may begin to synchronously transfer the disk state to the servers 206 and 208 when a transfer of a memory state of the virtual machines VM A1 and VM A2 begins.

The example distributive computing network manager 132 migrates a memory state of the virtual machines VM A1 and VM A2 by using a pre-copy mechanism to iteratively copy memory contents of the servers 134 and 136. At each iteration, the distributive computing network manager 132 may only send modified pages of memory to the servers 206 and 208. To increase the speed of memory state migration, the distributive computing network manager 132 may use a stop and copy optimization method (e.g., algorithm and/or routine) that limits a number of iterations by determining when the number of changed memory pages to be sent is lower than any previous iteration. When the number of changed pages is determined to be lower than any previous iteration, the distributive computing network manager 132 may pause the virtual machines VM A1 and VM A2 to send a final memory page iteration. In addition, the distributive computing network manager 132 may transmit index values of memory pages that are identical to previously transmitted memory pages (e.g., content-based redundancy). The example distributive computing network manager 132 may also improve the transfer time of the memory state by caching the memory pages, determining changes to those memory pages, and transmitting only the differences to the servers 206 and 208. The memory and disk state migration is further described in conjunction with FIGS. 3-5.

Upon migrating the virtual machines VM A1 and VM A2 to the second site 202, the distributive computing network manager 132 may instruct the virtual machines VM A1 and VM A2 to transmit an address resolution protocol (ARP) message. In some examples, the virtual machines VM A1 and VM A2 may transmit the ARP message upon being migrated to the servers 206 and 208. In other examples, the virtual machines VM A1 and VM A2 may transmit a BGP advertisement message. The second VLAN switch 204 uses the ARP message to establish a mapping between the second VLAN path 214, a MAC address and/or IP address space assigned to the virtual machines VM A1 and VM A2, and/or an interface and/or a switch port allocated to the virtual machines VM A1 and VM A2 within the servers 206 and 208. The second logical router 212 may use the ARP message to create a cross-reference of the second VLAN path 214 to the IP address space and/or MAC address assigned to the virtual machines VM A1 and VM A2. The second logical router 212 may forward the ARP message along the VPLS VPN 220 to the router 144 and/or the VLAN switch 142 at the first site 201. The ARP message informs the router 144 and/or the VLAN switch 142 that the virtual machines VM A1 and VM A2 at the servers 134 and 136 are unavailable. Further, after migrating the virtual machines VM A1 and VM A2 to the second site 202, the distributive computing network manager 132 may disable the VLAN path 150 and reallocate the servers 134 and 136 for other virtual machines.

Figure 3:
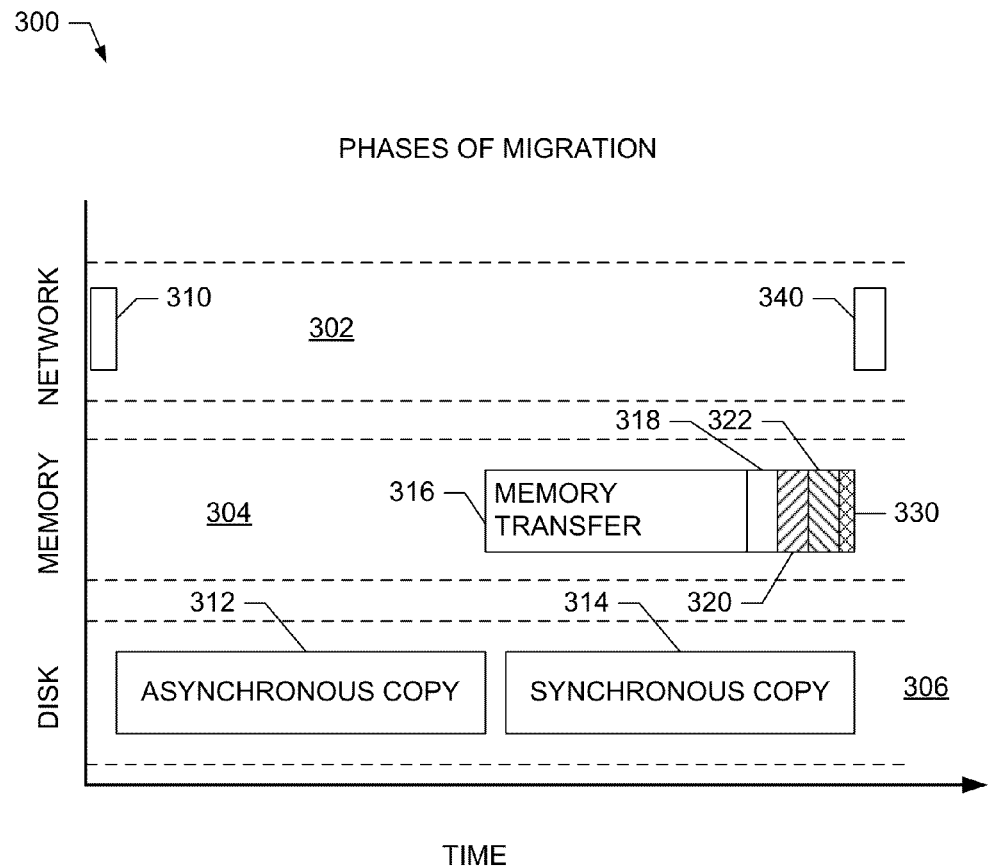
FIG. 3 shows an example chart of phases to migrate virtual machines VM A1 and VM A2 of FIG. 2 to the second site.

FIG. 3 shows an example chart 300 of phases to migrate the virtual machines VM A1 and VM A2 of FIG. 2. The migration shown in the example chart 300 may be carried out by the example distributive computing network manager 132 of FIGS. 1 and 2. The migration of the virtual machines VM A1 and VM A2 is separated into network events 302, memory state events 304, and disk state events 306. To start the migration of the virtual machines VM A1 and VM A2, the distributive computing network manager 132 creates a data link 310 (e.g., the VPLS VPN 220 of FIG. 2) from the first site 201 to the second site 202. Creating the data link 310 includes partitioning space on the servers 206 and 208 for the virtual machines VM A1 and VM A2, creating the second VLAN path 214, and allocating IP address space in the second logical router 212. Creating the data link 310 may also include linking the VLAN path 150 with the second VLAN path 214 through the switching network 102 to form a data link via the VPLS VPN 220. Alternatively, in examples where servers 206 and 208 are already configured to host other virtual machines associated with the client A, space on the servers 206 and 208 may already be allocated for the client A. At this point, the data associated with the virtual machines VM A1 and VM A2 may be migrated to the second site 202.

Upon creating the data link 310, the disk state of the virtual machines VM A1 and VM A2 may be transferred. To transfer the disk state, the distributive computing network manager 132 may perform an asynchronous copy 312 of the disk state by pre-copying disk blocks and transmitting those disk blocks to the servers 206 and 208. The pre-copying may be performed, for example, by an asynchronous mode of a DRBD storage migration system. The asynchronous copy 312 is performed to synchronize the disk state of the servers 206 and 208 with the servers 134 and 136 hosting the virtual machines VM A1 and VM A2. The distributive computing network manager 132 also performs a synchronous copy 314. The synchronous copy 314 may be performed, for example, by a synchronous mode of a DRBD storage migration system. The synchronous copy 314 ensures that the disk state of the servers 206 and 208 is in sync with the disk state of the servers 134 and 136 by synchronously propagating disk state changes to both sets of servers 134, 136, 206 and 208 during a memory transfer 316. In the example of FIG. 3, the asynchronous copy 312 is completed at the start of the memory transfer 316. Then, during the memory transfer 316, the distributive computing network manager 132 initiates the synchronous copy 314.

The distributive computing network manager 132 starts the memory transfer 316 after the asynchronous copy 312 of the disk state is complete so that the servers 206 and 208 include an initial disk state for the transferred memory. The initial memory transfer 316 includes iteratively copying the memory state of the virtual machines VM A1 and VM A2. The time for the memory transfer 316 may be dependent on RAM allocation of the virtual machines VM A1 and VM A2 within the servers 134 and 136, read and write rates, and/or available bandwidth on the VPLS VPN 220. For example, if the VPLS VPN 220 has a latency of 10 milliseconds (msec) from the first site 201 to the second site 202, migrating the virtual machines VM A1 and VM A2 with 400 Megabytes of memory may incur a virtual machine pause time (e.g., application downtime experienced by the Client A) of 0.04 seconds over a gigabit VPLS VPN 220 and a pause time of 7.7 seconds over a 100 Megabit VPLS VPN 220. The difference in time between the different link sizes may result a longer downtime of applications operated by the virtual machines VM A1 and VM A2 during the 7.7 seconds.

To reduce the transfer times of the memory transfer 316, the example distributive computing network manager 132 may include optimizations 318, 320, and 322. The optimizations 318, 320, and 322 may be utilized by the distributive computing network manager 132 upon the iterative pre-copy of the memory transfer 316. While the optimizations 318, 320, and 322 are shown occurring sequentially, the optimizations 318, 320, 322 may occur concurrently during the memory transfer 316. Further, while the optimizations 318, 320, 322 are shown occurring towards the end of the memory transfer 316, the optimizations 318, 320, and 322 may occur at least partially during other portions of the memory transfer 316.

The example content-based redundancy optimization 318 may be used by the distributive computing network manager 132 to reduce the transfer of redundant data. Some virtual machines (e.g., the virtual machines VM A1 and VM A2) may have redundant memory data from empty memory pages or similar blocks of data between different memory pages. The distributive computing network manager 132 uses content-based redundancy optimization 318 to detect identical, fixed sized portions of data in a memory page. Additionally, the distributive computing network manager 132 may use content-based redundancy optimization 318 for disk blocks during asynchronous copying 312 and/or synchronous copying 314 of the disk state. In some examples, the distributive computing network manager 132 may use, for example, Rabin fingerprints and/or a Super Fast Hash Algorithm to detect identical portions of memory during the memory transfer 316.

The example content-based redundancy optimization 318 partitions each memory page into a fixed number of blocks and generates hashes based on the content. If a hash matches an entry in caches at the servers 134 and 136 and in caches at the servers 206 and 208, then the distributive computing network manager 132 determines that a block with the same contents was previously sent. The distributive computing network manager 132 may then send an index value to the servers 206 and 208 identifying the identical portion of the memory state. In some examples, a memory page (or a disk block) may be partitioned into relatively smaller blocks enabling the distributive computing network manager 132 to find redundant data with finer granularity.

The page delta optimization 320 may be used by the distributive computing network manager 132 to transmit only memory state page changes during subsequent memory page iterations. For example, after the first memory state iteration, most of the memory pages transferred are pages that have been sent during the first iteration but have been modified by the virtual machines VM A1 and VM A2. Because an application operated by the virtual machines VM A1 and VM A1 may modify only portions of memory pages, the distributive computing network manager 132 may cache previously transmitted pages and determine differences between the previous pages and current pages. The distributive computing network manager 132 may then send the differences between the pages.

In some examples, the page delta optimization 320 may be configured to send relatively small page differences. For relatively large page differences, the page delta optimization 320 may transfer the entire page to reduce the transmission of multiple small page deltas for a single page. In this manner, the distributive computing network manager 132 may reduce the amount of data transferred to the servers 206 and 208 by sending only relatively small page updates, thereby reducing the amount and time of the migration of the virtual machines VM A1 and VM A2 to the servers 206 and 208.

The stop and copy optimization 322 may be used to limit the number of memory page iterations conducted by the memory transfer 316. The stop and copy optimization 322 may use a heuristic algorithm that monitors a number of memory pages remaining to be transferred to the servers 206 and 208 to find a local minimum in the number of remaining pages. The content-based redundancy optimization 318 and the page delta optimization 320 may be used by the distributive computing network manager 132 during the multiple copy page iterations. The stop and copy optimization 322 may then be used by the distributive computing network manager 132 to determine when to stop and/or pause the iterations.

Figure 4:
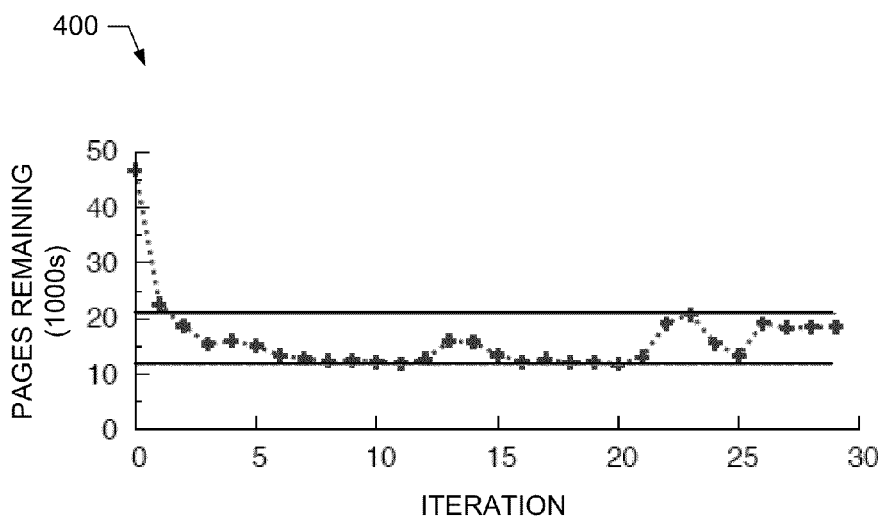
FIG. 4 shows an example graph of a number of pages remaining after iterative memory page transfers.

For example, a graph 400 in FIG. 4 shows a number of pages remaining after memory page transfer iterations. The graph 400 indicates that after four to six iterations the number of remaining memory pages to be sent does not substantially change. For example, the memory transfer 316 starts with 45,000 pages of memory to be copied. After three iterations, the number drops to 21,000 pages of memory. After five iterations, the number of pages to be sent decreases to 15,000. However, after five iterations, the example graph 400 shows that the number of pages remaining to be sent may remain around 15,000 because the virtual machine VM A1 may be writing to 15,000 pages periodically during the memory transfer 316. As a result, the entire memory state may not be copied because the virtual machine VM A1 continues to change the memory state by operating applications used by the Client A. At this point, continued memory page copy iterations may only extend the total migration time and increase a total amount of data transferred. Additionally, the continued memory page copy iterations may not further reduce a potential pause time of the virtual machine VM A1 for the distributive computing network manager 132 to transfer the final memory state.

By using the stop and copy optimization 322 in FIG. 3, the example distributive computing network manager 132 may store the remaining number of pages to be sent in a sliding history buffer. After a period of time, the distributive computing network manager 132 may determine if a current number of memory pages to be sent to the servers 206 and 208 is lower than any previous entry in the buffer (e.g., determining a local minimum). If the distributive computing network manager 132 determines a local minimum, the distributive computing network manager 132 may pause the virtual machine VM A1 and transfer the remaining memory state to the servers 206 and 208 (indicated by the pause block 330).

To indicate which of the optimizations 318, 320, and/or 322 the distributive computing network manager 132 is utilizing, the distributive computing network manager 132 may transmit a per-page meta packet that indicates to the servers 206 and 208 whether a full page, a cache index, and/or an index with a page delta is being transferred. A value of the index within the meta packet may indicate to the servers 206 and 208 where within the memory state and/or the cache to add the received memory pages. The value of the index may also indicate which portion of the cache at the servers 206 and 208 should be copied. In some examples, a delta length of zero within the meta packet may indicate to the servers 206 and 208 that the page is identical to a page in the cache of the servers 206 and 208. In yet other examples, the meta packets may be aggregated to reduce a number of relatively small transmissions.

Upon the stop and copy optimization 322 determining that additional iterations of memory pages should not be transferred, the example distributive computing network manager 132 pauses the virtual machines VM A1 and VM A2 during the pause block 330. The pausing may also correspond to the stopping of the synchronous copy 314 because the stopped virtual machines VM A1 and VM A2 are no longer able to write to memory. When the virtual machines VM A1 and VM A2 are paused, the distributive computing network manager 132 performs a memory state copy of the changed memory pages and a disk state copy of changed disk state and transfers the copies to the servers 206 and 208. At this point, the memory state and the disk state of the servers 134 and 136 at the first site 201 are substantially identical to the memory state and the disk state of the servers 206 and 208 at the second site 202. The distributive computing network manager 132 may then transmit ARP message(s) (e.g., during block 340) to redirect communications to the servers 206 and 208 instead of the servers 134 and 136. The virtual machines VM A1 and VM A2 may then provide the same applications and data that were hosted within the site 201. Further, the distributive computing network manager 132 may re-partition the memory space and disk space of the servers 134 and 136 for other applications and/or clients.

Figure 5:
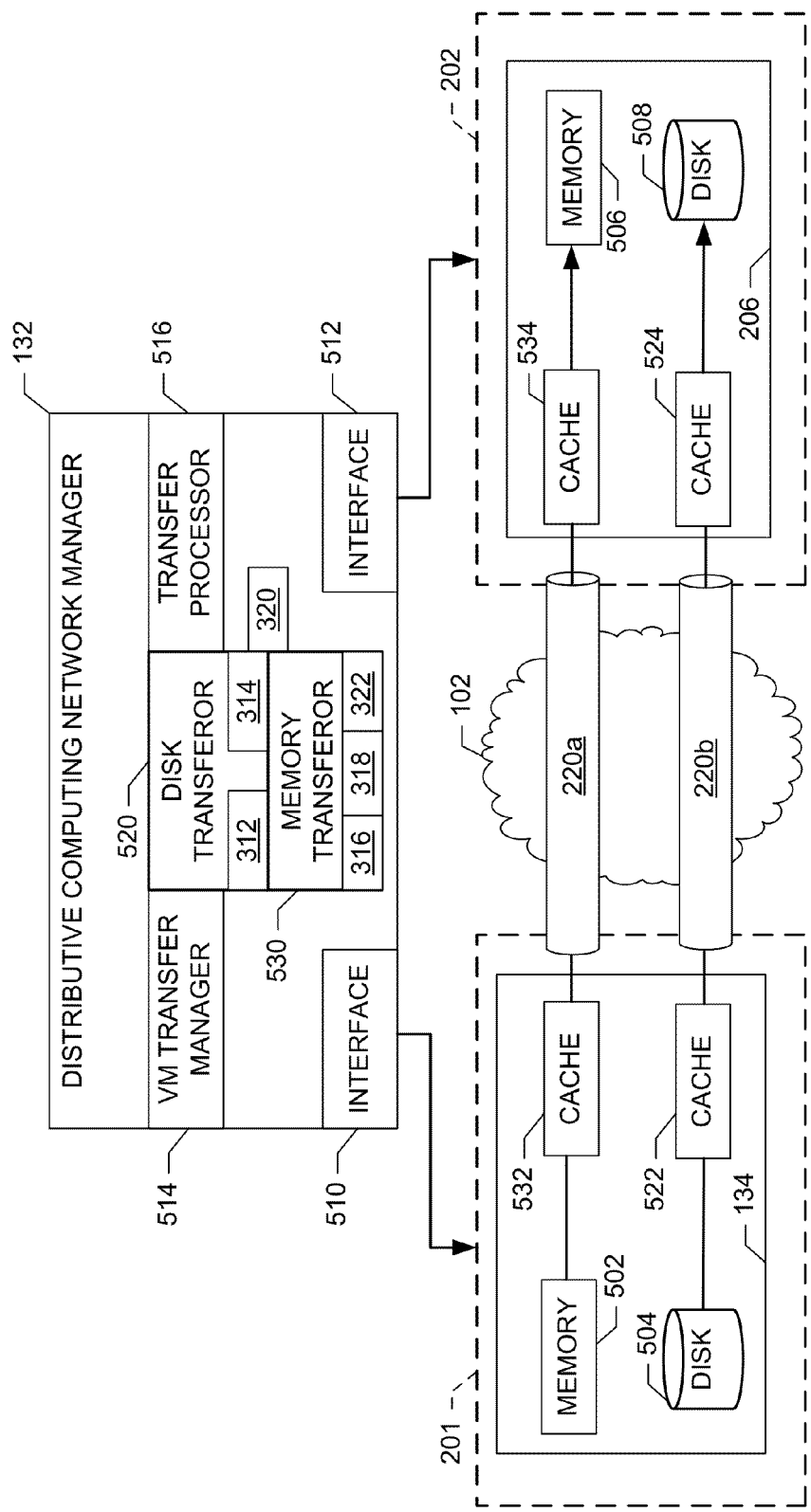
FIG. 5 shows a functional diagram of the example distributive computing network manager of FIGS. 1 and 2 migrating the virtual machine VM A1 from the first site to the second site.

FIG. 5 shows the example distributive computing network manager 132 of FIGS. 1 and 2 migrating the virtual machine VM A1 from the first site 201 to the second site 202. For brevity and clarity, the routers 106, 144, 146, 203, 210, and 212, the VLAN paths 150 and 214, and the VLAN switches 142 and 204 are included within VPLS VPNs 220a-b, which are data link partitions of the VPLS VPN 220. The first site 201 includes the server 134 hosting the virtual machine VM A1. The server 134 includes a memory 502 (e.g., RAM) and a disk 504 (e.g., a hard disk drive). The disk 504 may store computer code and baseline data associated with one or more applications. The memory 502 may store application data associated with the one or more applications. Similarly, the second site 202 includes a memory 506 and a disk 508. Initially, the memory 506 and the disk 508 are empty (e.g., contain no data) prior to the virtual machine VM A1 being transferred to the second site 202.

To interface with the server 134 at the first site 201 and the server 206 at the second site 202, the example distributive computing network manager 132 includes respective interfaces 510 and 512. The example interfaces 510 and 512 transmit instructions from the distributive computing network manager 132 to the respective servers 134 and 206 to migrate virtual machines. The distributive computing network manager 132 may include other interfaces to communicate with other servers and/or may use the interface 510 to communicate with other servers (e.g., the servers 136 and 138) within the first site 201 and the interface 512 to communicate with the other servers (e.g., the server 208) within the second site 202. The example interfaces 510 and 512 may also be used by the distributive computing network manager 132 to set up the virtual machine within the respective servers 134 and 206 and may be used to create VLAN paths within the respective sites 201 and 202.

The example interfaces 510 and 512 may also monitor the status of the virtual machine migration so that the distributive computing network manager 132 may modify the migration based on changing conditions. For example, the interface 510 may detect that memory pages are not being transmitted from the server 201. In response, the distributive computing network manager 132 may create and/or define another data link to the server 206.

To manage the migration of virtual machines (e.g., the virtual machine VM A1), the example distributive computing network manager 132 of FIG. 5 includes a VM transfer manager 514. The VM transfer manager 514 may determine when and/or where to transfer a virtual machine. For example, the VM transfer manager 514 may receive instructions from a client to migrate the virtual machine VM A1. The instructions may identify the virtual machine, applications operated by the virtual machine, servers hosting the virtual machine, a destination location, and/or a destination service provider. Alternatively, the VM transfer manager 514 may decide to migrate the virtual machine VM A1 based on hardware and/or memory allocations, traffic, and/or limited bandwidth within the first site 201. The VM transfer manager 514 may also decide to transfer a virtual machine based on maintenance and/or upgrades to the server 134.

Upon determining to migrate the virtual machine VM A1, the VM transfer manager 514 may identify available memory, disk and/or server space (e.g., the server 206, the memory 506, and the disk 508) within the second site 202. The VM transfer manager 514 may assign the server 206 a MAC address and/or an IP address and use the assigned address to establish a VLAN path (e.g., the second VLAN path 214) within the second site 202. The example VM transfer manager 514 may then create a data link (e.g., the VPLS VPNs 220a-b) across the switching network 102 (e.g., a WAN). The created data link may communicatively couple the servers 134 and 206, thereby enabling transfer of memory and disk states.

Upon the completion of a virtual machine migration, the VM transfer manager 514 may un-assign the memory 502 and the disk 504 from the virtual machine VM A1, enabling the memory 502 and the disk 504 to be used for other virtual machines hosted by the server 134. The VM transfer manager 514 may also transmit and/or broadcast ARP message(s) (and/or BGP advertisements) to update VRF tables of routers (e.g., the routers 106-110) to link the VLAN path 214 from the server 206 to the VPN of the client. In some examples, the VM transfer manager 514 may transmit the ARP message(s) upon the complete migration of the virtual machine VM A1. In other examples, the ARP message(s) may be transmitted during the migration of the virtual machine VM A1.

To manage the transfer of memory and disk states, the example distributive computing network manager 132 includes a transfer processor 516. The example transfer processor 516 may instruct the server 134 to transmit memory pages from the memory 502 and disk blocks from the disk 504. The example transfer processor 516 may also indicate the destination server 206 via the instructions. The example transfer processor 516 may receive a list of disk blocks to transfer from a disk transferor 520. The example disk transferor 520 may use a transfer routine (e.g., the storage migration system DRBD) to transfer disk blocks associated with the virtual machine VM A1 from the disk 504.

For example, upon receiving an instruction from the VM transfer manager 514 indicating the virtual machine VM A1 is to be transferred, the disk transferor 520 may access the disk 504 within the server 134 and identify disk blocks associated with the virtual machine VM A1. The disk transferor 520 may then utilize the asynchronous copy 312 to migrate the disk blocks to the disk 508. To transfer disk blocks, the disk transferor 520 may instruct the transfer processor 516 to copy blocks from the disk 504 and transfer the copied blocks to the cache 522 and to the disk 508 via the VPLS VPN 220b.

Further, to identify changed disk blocks, the disk transferor 520 may utilize a cache 522 within the server 134 to store the transferred disk blocks. The cache 522 may also include an index of the location of each of the transferred disk blocks. The disk transferor 520 may also utilize a cache 524 within the server 206 for storing received disk blocks.

During the synchronous copy 314, the disk transferor 520 may compare current disk blocks to previously transferred disk blocks in the cache 522 (e.g., utilize the page delta optimization 320). Instead of transferring the current disk blocks, the disk transferor 520 may instruct the transfer processor 516 to only send a meta packet including an index value of the location of the changed blocks and the differences between the disk blocks to the server 206. The example server 206 may then update the cache 524 and/or the disk 508 with the changed portions of the disk blocks. In examples where some disk blocks may be identical, the disk transferor 520 may instruct the transfer processor 516 to send a meta packet listing only the index location of the identical disk blocks within the cache 524. When the virtual machine VM A1 is paused for the last disk state transfer, disk transferor 520 may instruct the transfer processor 516 to transmit the remaining differences between the current disk blocks and previously cached disk blocks.

Additionally, the example transfer processor 516 of FIG. 5 may receive a list of memory pages to be transferred from a memory transferor 530. The example memory transferor 530 may utilize the memory transfer 316 by iteratively transferring pages from the memory 502. For each iteration, the memory transferor 530 may instruct the transfer processor 516 to perform a copy of the memory pages within the memory 502 and transfer those memory pages to a cache 532 and to the memory 506 via the VPLS VPN 220a. The memory transferor 530 may monitor the memory 502 for changes by the virtual machine and determine any differences between written memory pages and previously transferred memory pages stored in the cache 532. The memory transferor 530 may then instruct the transferor processor 516 to transmit a meta packet to the server 206 identifying via an index changed memory pages, and the changed content of the memory pages. Upon receiving the meta packet, the server 206 may use the index value to locate the memory pages within the cache 534 and update the corresponding memory pages with the changed content within the cache 534 and/or the memory 506. In this manner, the memory transferor 530 may utilize the page delta optimization 320.

The memory transferor 530 may also utilize the content-based redundancy optimization 318 to partition the memory 502 into a fixed number of blocks and generate hashes based on the content within each of the blocks. The memory transferor 530 may store the hashes and iteratively read the contents of the pages within the memory 502 to determine matching hashes. When the memory transferor 530 identifies matching hashes, the memory transferor 530 may send a meta packet with an index value of the corresponding matching pages to the server 206.

Additionally, the memory transferor 530 of FIG. 5 may utilize stop and copy optimization 522 to determine when to pause the virtual machine and the iterative memory transfer 316. The memory transferor 530 may also instruct the disk transferor 520 to pause the synchronous copy 314 when the memory transfer 316 is paused. To utilize the stop and copy optimization 318, the memory transferor 530 may include a sliding scale buffer that tracks the number of memory pages remaining to be transferred. In other examples, the sliding scale buffer may be stored to the cache 532. When the memory transferor 530 detects a local minimum in a number of memory pages to be transferred after a period of time, the memory transferor 530 may instruct the VM transfer manager 514 to pause (e.g., the pause block 330) the virtual machine VM A1 (including associated applications) and instruct the transfer processor 516 to perform a final copy and transfer iteration of the memory pages.

The memory transferor 530 may also instruct the VM transferor manager 514 when the final memory transfer is complete. Upon receiving a completion message, the VM transfer manager 514 may transmit ARP message(s) (e.g., during the block 340 of FIG. 3) to link the transferred virtual machine VM A1 to the client and resume operation of the virtual machine VM A1 within the server 206. While the caches 522, 524, 532 and 534 are shown included within the respective servers 134 and 206, the caches 522, 524, 532 and 534 may be included within other devices within the respective sites 201 and 202. Alternatively, the caches 522, 524, 532 and 534 may be included within routers (e.g., the routers 106, 144, 203 and/or 210) along the VPLS VPNs 220a-b.

While the example distributive computing network 132 and the sites 201 and 202 have been illustrated in FIG. 5, one or more of the servers, platforms, interfaces, data structures, elements, processes and/or devices illustrated in FIG. 5 may be combined, divided, re-arranged, omitted, eliminated and/or implemented in any way. Further, the example memories 502 and 506, the example disks 504 and 508, the example servers 134 and 206, the example interfaces 510 and 512, the example VM transfer manager 514, the example transfer processor 516, the example disk transferor 520, the example memory transferor 530, and/or more generally, the example distributive computing network 132 and/or the sites 201 and 202 may be implemented by hardware, software, firmware and/or any combination of hardware, software and/or firmware. Thus, for example, any of the example memories 502 and 506, the example disks 504 and 508, the example servers 134 and 206, the example interfaces 510 and 512, the example VM transfer manager 514, the example transfer processor 516, the example disk transferor 520, the example memory transferor 530, and/or more generally, the example distributive computing network 132 and/or the sites 201 and 202 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example memories 502 and 506, the example disks 504 and 508, the example servers 134 and 206, the example interfaces 510 and 512, the example VM transfer manager 514, the example transfer processor 516, the example disk transferor 520, and/or the example memory transferor 530 are hereby expressly defined to include a computer readable medium such as a memory, DVD, CD, etc. storing the software and/or firmware. Further still, the example distributive computing network 132 and/or the sites 201 and 202 may include one or more elements, processes and/or devices in addition to, or instead of, those illustrated in FIG. 5, and/or may include more than one of any or all of the illustrated elements, processes and devices.

FIG. 6 shows a chart 600 of migration performance for different applications operated by a virtual machine. The data within the example chart 600 is generated by the distributive computing network manager 132 migrating SPECjbb 2005, Kernel Compile, and TPC-W applications from a data center in Texas to a data center in Illinois. The data centers were connected over a WAN with a round trip latency of about 27 msec and a throughput of 464 Mbps. The chart 600 shows the migrations performed by the distributive computing network manager 132 (DCNM) utilizing the optimizations 318, 320, and/or 322 and a Xen transfer system that did not utilize the optimizations 318, 320, and/or 322. The Xen transfer system may currently be used to migrate virtual machines by performing a number of page copy iterations prior to pausing a virtual machine to perform a final page copy.

The example SPECjbb 2005 application is a java server benchmark that emulates a client/server business application. The SPECjbb 2005 application may perform computations for business logic and may maintain application data in memory with minimal disk activity. The example Kernel Compile application is a development workload that uses a Linux 2.6.31 kernel with corresponding modules. The Kernel Compile application includes relatively moderate disk reads and writes. Further, the memory associated with the Kernel Compile application may be mainly used by the page cache. In the example of FIG. 6, a compilation cluster may use distcc to distribute compilation activities across several virtual machines that are migrated together.

The TPC-W application is a web benchmark that emulates an online retail site. In the example of FIG. 6, the TPC-W application is run in a two tier setup using Tomcat 5.5 and MySQL 5.0.45. Each of the tiers may be operated within a single virtual machine. Additional servers may be used to operate client workload generators that emulate 600 simultaneous customers accessing the site using a 'shopping' workload that performs a mix of read and write operations.

The example in FIG. 6 shows that for each of the applications transferred, the distributive computing network manager 132 transferred less data than the Xen system. For example, the distributive computing network manager 132 transferred 0.9 gigabytes (GB) of data compared to the 1.5 GB of transferred data by the Xen system. This indicates that the optimizations 318, 320, and 322 reduce the amount of redundant data transferred. Further, because the stop and copy optimization 322 reduces copy iterations (thereby reducing the amount of data transferred) and the optimizations 318 and 320 directly reduce the amount of data transferred, the distributive computing network manager 132 is able to transfer the applications in a shorter time than the Xen system. Similarly, because less data needs to be transferred at the final copy iteration, the example distributive computing network manager 132 has a relatively shorter pause time during the migration of the applications than the Xen system.

FIG. 7 shows graphs 710, 720, and 730 that illustrate improvements in migration performance of the distributive computing network manager 132 compared to the Xen system. The example graph 710 corresponds to the Kernel Compile application, the graph 720 corresponds to the TPC-W application, and the graph 730 corresponds to the SPECjbb 2005 application. The example graphs 710, 720, and 730 show the percent reduction for each of the optimizations 318, 320, and 322 for each of the measurement parameters shown in FIG. 6.

For example, in the graph 710, the stop and copy optimization 322 (e.g., Smart) used by the distributive computing network manager 132 provides about a 20% reduction in the amount of data transferred and the total transfer time and about a 33% reduction in the pause time compared to the Xen system. Similarly, the content-based redundancy optimization 318 (e.g., CRB) used by the distributive computing network manager 132 provides about a 15% reduction in the amount of data transferred and the total transfer time and about a 40% reduction in the pause time compared to the Xen system. Also, the page delta optimization 310 (e.g., Deltas) used by the distributive computing network manager 132 provides about a 13% reduction in the amount of data transferred, a 2% reduction in the total transfer time, and about a 3% reduction in the pause time compared to the Xen system. As a total benchmark, the combination of the optimizations 318, 320, and 322 (e.g., S+C+D) shows about a 30% reduction in the amount of data transferred and the total transfer time and about a 45% reduction in the pause time when the distributive computing network manager 132 was used compared to the Xen system.

The difference in performance represented by the graphs 710, 720, and 730 may be based on differences between the Kernel Compile application, the TPC-W application, and the SPECjbb 2005 application. For example, each of the applications may have different amounts of redundant memory, which affects the content-based redundancy optimization 318 metrics. In another example, the SPECjbb benchmark application may have a different memory behavior that limits the benefit of the stop and copy optimization 322 because customers are constantly using different portions of the application. For each copy iteration, the SPECjbb application may only send a relatively small portion of the memory until the final iteration. As a result, the final iteration may transmit most of the memory pages at the final iteration. This may be reflected in the relatively small improvements in pause time of the SPECjbb application shown in the graph 730.

In yet another example, the difference in the performance of the page delta optimizations 320 for each of the applications is shown in chart 800 of FIG. 8. The example chart shows that during a first iteration, each of the applications transferred between 877-954 megabytes (MB) of data. Then, during iterations 2-30 the page delta optimization 320 reduced the amount of data transferred. For example, the TPC-W application reduced the memory transferred from 487 MB to 315 MB, a 36 percent improvement. Further, the page delta optimization 320 saves approximately 172 MB of data from being transferred by the distributive computing network manager 132.

FIG. 9 shows example graphs 910 and 920 depicting a total time to transfer a virtual machine with the distributive computing network manager (DCNM) 132 of FIGS. 1, 2, and 5 and the Xen system. The data shown within the graphs 910 and 920 was generated on a testbed that includes a pair of Sun servers with dual quad-core Xeon central processing units and 32 GB of RAM. Each of the servers was connected to a Juniper M7i router and with VPLS connectivity established by a gigabit Ethernet to a PacketSphere Network Emulator capable of adjusting the bandwidth, latency, and packet loss. The graph 910 is associated with the TPC-W application and the graph 920 is associated with the SPECjbb 2005 application.

The example graphs 910 and 920 show that decreased bandwidth lowers the performance (e.g., increases the total transfer time) for the applications. Because the distributive computing network manager 132 reduces the amount of data that is transferred during the migration via the optimizations 318, 320, and 322, the distributive computing network manager 132 has a lower transfer time compared to the Xen system. The transfer time difference between the distributive computing network manager 132 and the Xen system increases as the bandwidth increases. This indicates that the distributive computing network manager 132 may provide relatively shorter transfer time than the Xen system across data links with lower bandwidths. Because data links over a WAN have generally lower bandwidth, the graphs 910 and 920 indicate the distributive computing network manager 132 migrates virtual machines faster than the Xen system. Further, tests performed by the testbed indicate similar improvements in transfer time using the optimizations 318, 320, and 322 on the distributive computing network manager 132 for varying degrees of latency. For example, using the TPC-W application, the distributive computing network manager 132 may have a total transfer time of 100 seconds compared to a total transfer time of 200 seconds using the Xen system over a network with 80 msec of roundtrip latency.

FIG. 10 shows an example graph 1000 of response time of the TPC-W application during a disk state transfer and a memory state transfer by the distributive computing network manager 132 and the Xen system. In this example, a virtual machine was operating the TPC-W application while the distributive computing network manager 132 and the Xen System were transferring disk and memory states across a 100 Mbps link with 20 msec roundtrip latency. The graph 1000 shows that the response time between the distributive computing network manager 132 and the Xen system are about the same during the disk transfer time of 39.5 minutes. When the memory transfer begins, the distributive computing network manager 132 has a shorter window of increased response time compared to the Xen system. In other words, the distributive computing network manager 132 has a total response time decrease in performance for 99 seconds while the Xen system has a total response time decrease in performance for 176 seconds. Further, the graph 10 shows that the distributive computing network manager 132 completes the migration at 40.9 minutes while the Xen system completes migration at 42 minutes.

Figure 11A:
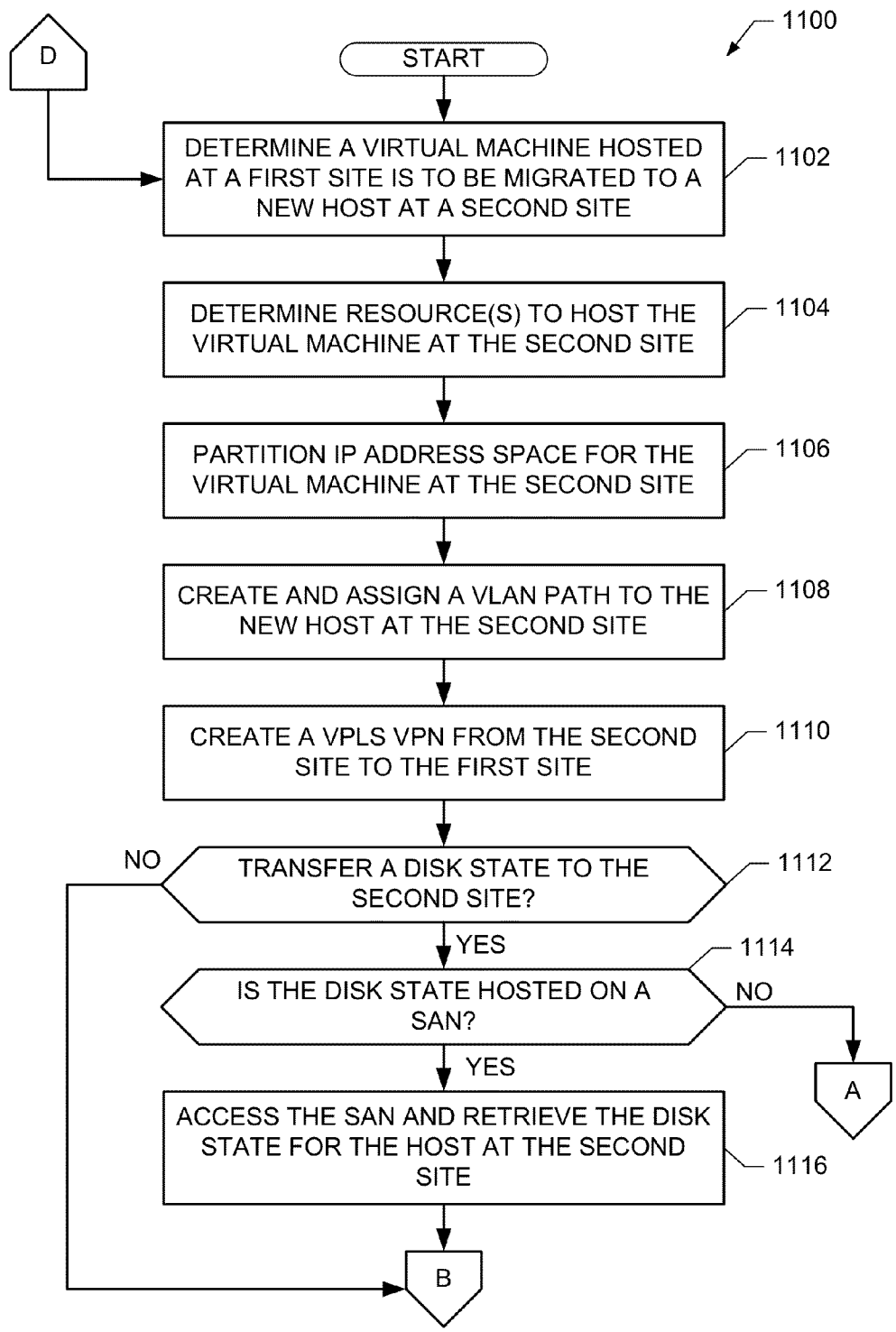
FIGS. 11A, 11B, and 11C are flowcharts representative of example machine-accessible instructions, which may be executed to implement the distributive computing network manager of FIGS. 1, 2, and 5.
Figure 11B:
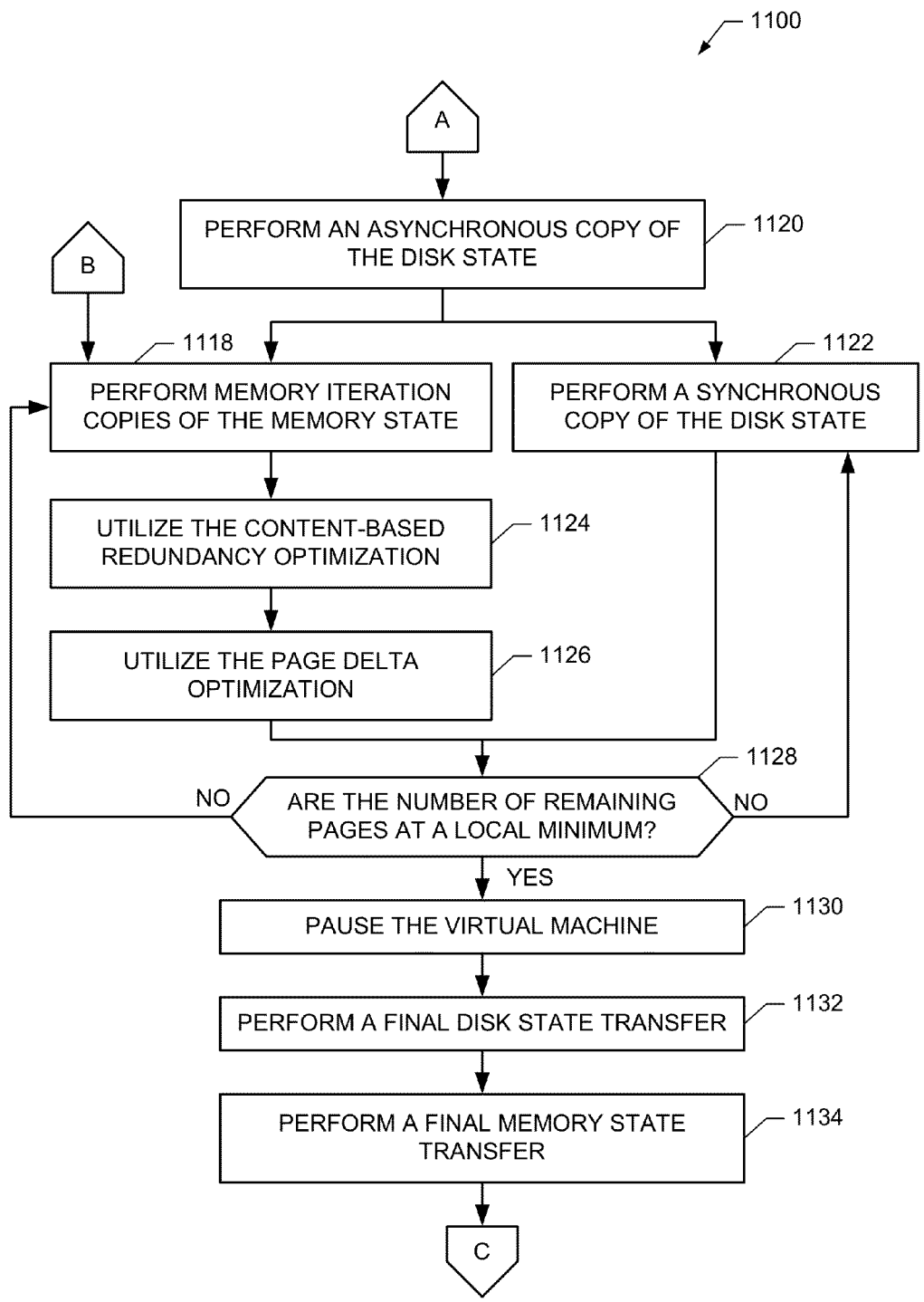
Figure 11C:
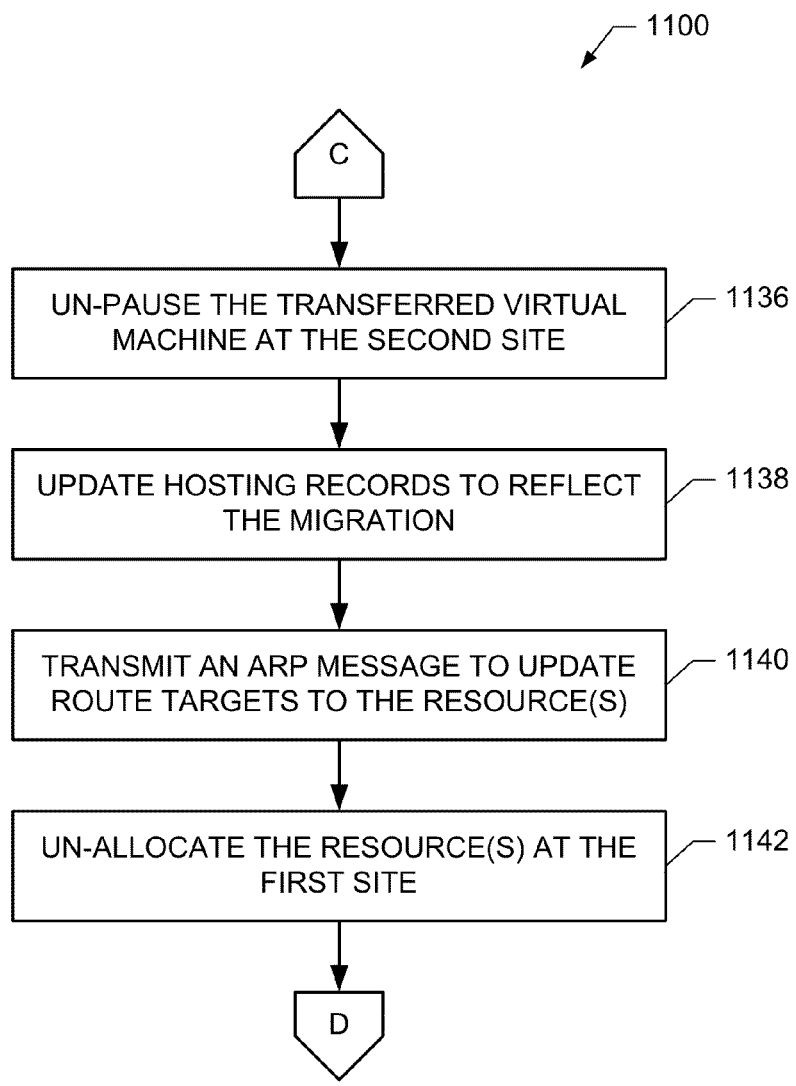

FIGS. 11A, 11B, and 11C depict example flow diagrams representative of processes that may be implemented using, for example, computer readable instructions that may be used to migrate virtual machines between distributive computing networks across a WAN. The example processes of FIGS. 11A, 11B, and 11C may be performed using a processor, a controller and/or any other suitable processing device. For example, the example processes of FIGS. 11A, 11B, and 11C may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 11A, 11B, and 11C may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 11A, 11B, and 11C may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 11A, 11B, and 11C may be implemented manually or as any combination(s) of any of the foregoing techniques, for example, any combination of firmware, software, discrete logic and/or hardware. Further, although the example processes of FIGS. 11A, 11B, and 11C are described with reference to the flow diagrams of FIGS. 11A, 11B, and 11C, other methods of implementing the processes of FIGS. 11A, 11B, and 11C may be employed. For example, the order of execution of the blocks may be changed, and/or some of the blocks described may be changed, eliminated, sub-divided, or combined. Additionally, any or all of the example processes of FIGS. 11A, 11B, and 11C may be performed sequentially and/or in parallel by, for example, separate processing threads, processors, devices, discrete logic, circuits, etc.

The example machine-readable instructions 1100 of FIG. 11A begin by determining that a virtual machine hosted at a first site on a server is to be migrated to a second host at a second site (e.g., via the VM transfer manager 514) (block 1102). The virtual machine may be migrated based on instructions from a client and/or based on conditions within the first site. The example instructions 1100 then determine one or more resources (e.g., disk space and/or memory space on at least one server) to host the virtual machine at the second site (e.g., via the VM transfer manager 514) (block 1104). The example instructions 1100 initialize the second site by partitioning IP address space for the virtual machine at the second site (e.g., via the VM transfer manager 514) (block 1106). The example instructions 1100 may also partition a router by the assigned IP address space to create a logical router. Further, the example instructions 1100 may configure the resource(s) and/or interface(s) of the resource(s) to host the virtual machine at the second site.

The example instructions 1100 then create and/or assign a VLAN path to the servers(s) that are to host the virtual machine at the second site (e.g., via the VM transfer manager 514) (block 1108). The example instructions 1100 may then create a VPLS VPN from a VLAN path associated with the virtual machine at the first site to the VLAN path at the second site (e.g., via the VM transfer manager 514) (block 1110).

To migrate the virtual machine, the example instructions 1100 determine if a disk state is to be transferred to the second site (e.g., via the transfer processor 516 and/or the disk transferor 520) (block 1112). If the disk state is to be transferred, the example instructions 1100 determine if the disk state is hosted on a SAN (e.g., via the disk transferor 520) (block 1114). If the disk state is hosted on a SAN, the example instructions 1100 access the SAN and store the disk state to the host (e.g., the server(s)) at the second site (e.g., via the disk transferor 520) (block 1116). The example instructions 1100 may then perform iterative memory copies of the memory state (e.g., via the memory transferor 530) (block 1118). The example instructions 1100 may also perform the iterative memory copies of the memory state (block 1118) upon determining that the disk state is not to be transferred in the block 1112.

Additionally, if the disk state is not hosted on a SAN, the example instructions 1100 of FIG. 11B perform an asynchronous copy of the disk state at the host (e.g., via the disk transferor 520) (block 112). Upon finishing the asynchronous copy, the example instructions 1100 may then perform iterative memory copies (block 1118) and concurrently the example instructions 1100 may perform iterative synchronous copies of the disk state (e.g., via the disk transferor 520) (block 1122).

During the iterative memory copies, the example instructions 1100 may utilize the content-based redundancy optimization (e.g., via the memory transferor 530) (block 1124) and utilize the page delta optimization (e.g., via the memory transferor 530) (block 1126). The example instructions 1100 may also determine if a number of remaining memory pages are at a local minimum using the stop and copy optimization (e.g., via the memory transferor 530) (block 1128). If the number of remaining memory pages is not a local minimum, the example instructions 1100 may continue to perform the iterative memory copy (block 1118) and the synchronous disk copy (block 1122).

However, if the number of remaining pages is at a local minimum, the example instructions 1100 pause the virtual machine to be transferred (e.g., via the VM transfer manager 514) (block 1130). The example instructions 1100 may then perform a final disk state transfer (e.g., via the disk transferor 520) (block 1132) and perform a final memory state transfer (e.g., via the memory transferor 530) (block 1134).

Upon performing the migration of the virtual machine to the second site via the disk state and memory state transfers, the example instructions 1100 of FIG. 11C may then unpause the virtual machine at the second site (e.g., via the VM transfer manager 514) (block 1136). The example instructions 1100 may then update hosting records to reflect the migration (e.g., via the VM transfer manager 514) (block 1138).

The example instructions then instruct the virtual machine at the second site to transmit an ARP message to update forwarding entries in the switches 142 and 204 with the location and/or route target of the resource(s) hosting the virtual machine (e.g., via the VM transfer manager 514) (block 1140). In other examples, the virtual machine and/or the VM transfer manager 514 may transmit the ARP message upon the virtual machine being migrated. Alternatively, the example instructions 1100 and/or the virtual machine may transmit a BGP advertisement to update VRF table entries within network routers. The example instructions 1100 then un-allocate the resources(s) (e.g., the disk state and the memory state) at the first site associated with the migrated virtual machine (e.g., via the VM transfer manager 514) (block 1142). Additionally, the example instructions 1100 may disable the VLAN path and/or the logical router at the first site associated with the migrated virtual machine. The example instructions 1100 of FIG. 11A may then loop back to migrate another virtual machine (block 1102).

Figure 12:
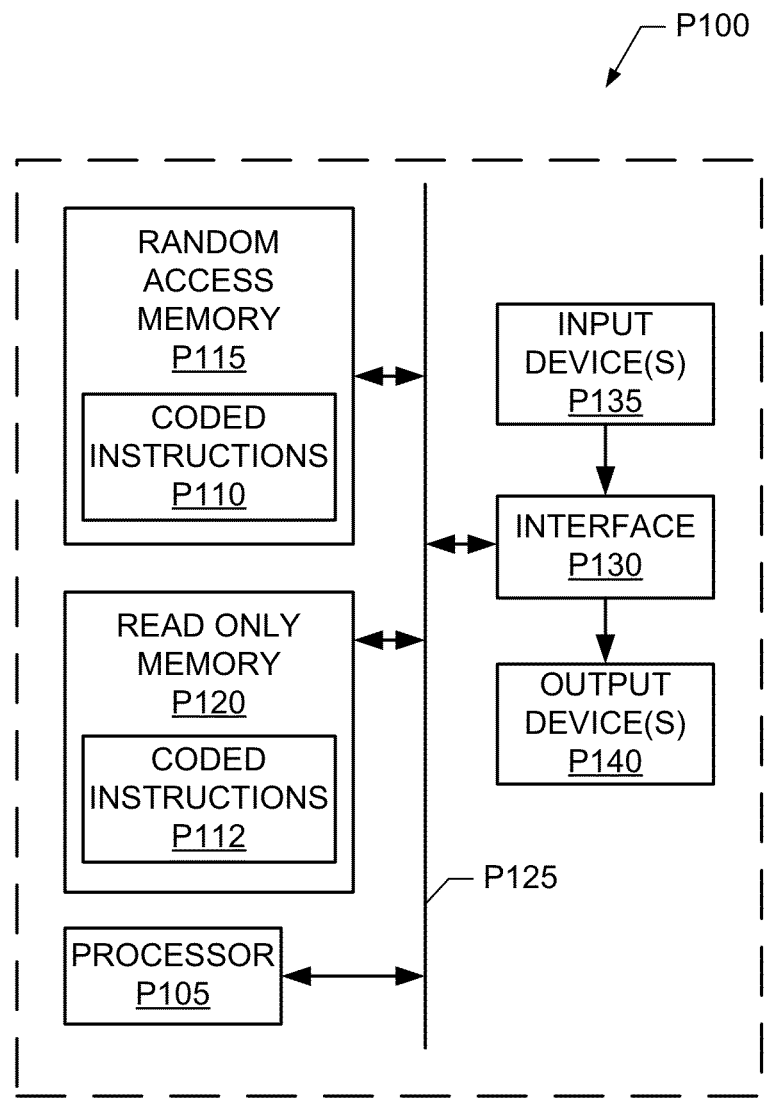
FIG. 12 is a schematic illustration of an example processor platform that may be used and/or programmed to execute the example processes and/or the example machine-accessible instructions of FIGS. 11A, 11B, and 11C to implement any or all of the example methods, apparatus and/or articles of manufacture described herein.

FIG. 12 is a schematic diagram of an example processor platform P100 that may be used and/or programmed to implement the example distributive computing network manager 132, the example memories 502 and 506, the example disks 504 and 508, the example servers 134 and 206, the example interfaces 510 and 512, the example VM transfer manager 514, the example transfer processor 516, the example disk transferor 520, and/or the example memory transferor 530 of FIGS. 1, 2, and/or 5. For example, the processor platform P100 can be implemented by one or more general-purpose processors, processor cores, microcontrollers, etc.

The processor platform P100 of the example of FIG. 12 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 11A, and/or 11B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example memory 502 and 506 and/or the example disk 504 and 508 of FIG. 5.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. A method comprising:
    establishing, by a processor, a data link across a network between a first distributive computing network and a second distributive computing network, the first distributive computing network including a virtual machine operated by a first host communicatively coupled to a virtual private network via a virtual local area network;
    migrating, by the processor, the virtual machine via the data link to a second host included within the second distributive computing network by transmitting a memory state of an application on the first host to the second host while the application is operating;
    pausing, by the processor, the application on the first host; and
    while the application is paused, transferring, by the processor, a final memory state of the application on the first host to the second host.

2. The method of claim 1, further comprising operating the virtual machine at the second host within the second distributive computing network upon receiving a portion of the memory state.

3. The method of claim 1, further comprising determining the second host by identifying available disk space within a server.

4. The method of claim 1, further comprising using an address resolution protocol to update a router with an address associated with the second host to route data between the virtual private network and the second host.

5. The method of claim 1, wherein migrating the virtual machine via the data link to the second host included within the second distributive computing network by transmitting the memory state of the application on the first host to the second host comprises:
    iteratively transferring memory associated with the application operating on the virtual machine at the first host to the second host,
    recording a number of pages associated with the memory remaining to be transferred for the application in a sliding history buffer, and
    determining when a number of pages associated with the memory remaining is lower than any previous entry in the sliding history buffer; and
    wherein pausing the application comprises pausing the application when the number of pages associated with the memory remaining is lower than any previous entry in the sliding history buffer.

6. The method of claim 1, wherein migrating the virtual machine via the data link to the second host included within the second distributive computing network by transmitting the memory state of the application on the first host to the second host comprises transferring the memory state using content-based redundancy.

7. The method of claim 1, wherein migrating the virtual machine via the data link to the second host included within the second distributive computing network by transmitting the memory state of the application on the first host to the second host comprises:
    storing a cache of transmitted pages associated with the memory state of the application;
    determining a difference between portions of modified pages and the transmitted pages stored; and
    transmitting the difference to the second host.

8. The method of claim 1, wherein migrating the virtual machine comprises transferring a disk state of the application to the second host at the second distributive computing network.

9. The method of claim 8, wherein transferring the disk state comprises:
    transferring the disk state asynchronously until the second host is at a consistent state with the first host; and
    upon the second host reaching the consistent state, synchronously propagating disk updates as the disk updates occur at the virtual machine on the first host to second the host.

10. The method of claim 9, wherein transferring the disk state comprises:
    accessing a storage area network with the second distributive computing network; and
    transmitting the disk state from the storage area network to the second host.

11. The method of claim 1, further comprising:
    aggregating the second host into a group with other hosts located at other distributive computing networks; and
    allocating the second host and the other hosts within the group among virtual machines.

12. The method of claim 1, further comprising:
    determining an issue associated with the first distributive computing network; and
    determining to mitigate the issue by migrating the virtual machine to the second distributive computing network.

13. A system comprising:
    a processor; and
    a memory storing instructions that, when executed by the processor, cause the processor to perform operations comprising
        establishing a data link across a network between a first distributive computing network and a second distributive computing network, the first distributive computing network including a virtual machine operated by a first host communicatively coupled to a virtual private network via a first virtual local area network,
        migrating the virtual machine via the data link to a second host included within the second distributive computing network by transmitting a memory state of an application on the first host to the second host while the application is operating,
        pausing the application on the first host, and
        while the application is paused, transferring a final memory state of the application on the first host to the second host.

14. The system of claim 13, wherein the memory stores further instructions that, when executed by the processor, cause the processor to perform operations comprising communicatively coupling the second host to the virtual private network via a second virtual local area network.

15. The system of claim 13, wherein migrating the virtual machine via the data link to the second host included within the second distributive computing network by transmitting the memory state of the application on the first host to the second host comprises
- iteratively transferring memory associated with the application operating on the virtual machine at the first host to the second host,
- recording a number of pages associated with the memory remaining to be transferred for the application in a sliding history buffer, and
- determining when a number of pages associated with the memory remaining is lower than any previous entry in the sliding history buffer; and
- wherein pausing the application comprises pausing the application when the number of pages associated with the memory remaining is lower than any previous entry in the sliding history buffer.

16. The system of claim 13, wherein migrating the virtual machine via the data link to the second host included within the second distributive computing network by transmitting the memory state of the application on the first host to the second host comprises:
- storing a cache of transmitted pages associated with the memory state of the application;
- determining a difference between portions of modified pages and the transmitted pages stored; and
- transmitting the difference to the second host.

17. The system of claim 13, wherein migrating the virtual machine comprises transferring a disk state of the application to the host at the second distributive computing network.

18. The system of claim 17, wherein transferring the disk state comprises:
- transferring the disk state asynchronously until the second host is at a consistent state with the first host; and
- upon the second host reaching the consistent state, synchronously propagating disk updates as the disk updates occur at the virtual machine on the first host to second the host.

19. A tangible computer readable medium storing instructions that, when executed by a processor, cause the processor to perform operations comprising:
- establishing a data link across a wide area network between a first distributive computing network and a second distributive computing network, the first distributive computing network including a virtual machine operated by a first host communicatively coupled to a virtual private network via a virtual local area network;
- migrating the virtual machine via the data link by transmitting a memory state of an application on the first host to a second host included within the second distributive computing network while the application is operating;
- pausing the application on the first host; and
- while the application is paused, transferring a final memory state of the application on the first host to the second host.

20. The tangible computer readable medium of claim 19, wherein migrating the virtual machine via the data link by transmitting the memory state of the application on the first host to a second host included within the second distributive computing network comprises
- iteratively transferring memory associated with the application operating on the virtual machine at the first host to the second host,
- recording a number of pages associated with the memory remaining to be transferred for the application in a sliding history buffer, and
- determining when a number of pages associated with the memory remaining is lower than any previous entry in the sliding history buffer; and
- wherein pausing the application comprises pausing the application when the number of pages associated with the memory remaining is lower than any previous entry in the sliding history buffer.

* * * * *